Aug. 18, 1970     T. E. DAVIES     3,524,632
FLAME GRID AND COMPONENT PARTS THEREOF
Filed June 12, 1968     7 Sheets-Sheet 1
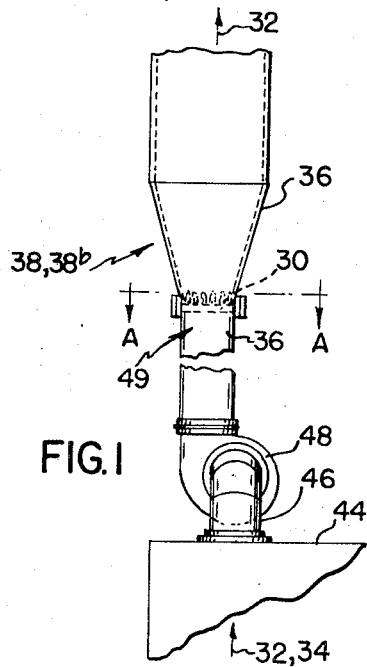
FIG.1
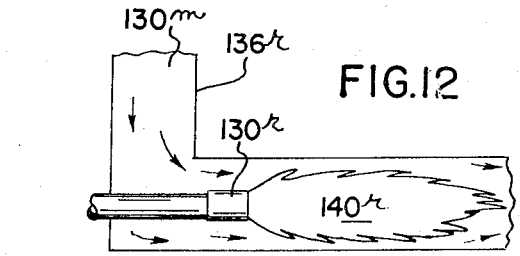
FIG.12
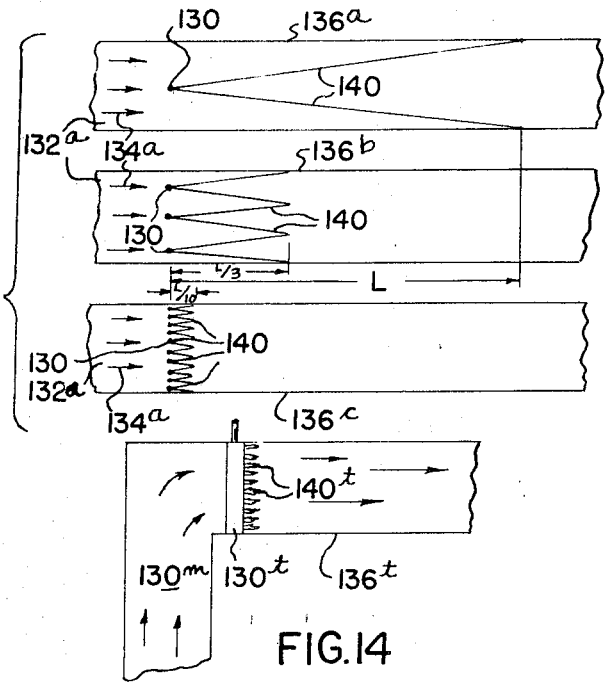
FIG.11
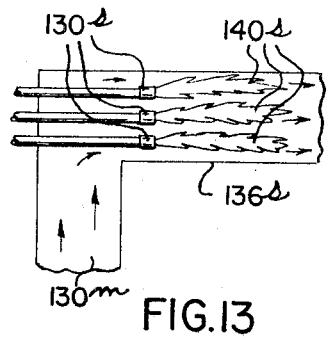
FIG.13
FIG.14
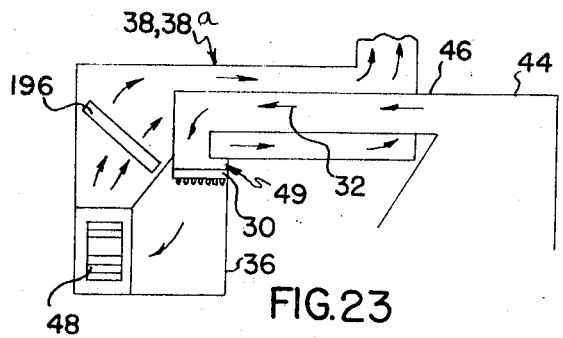
FIG.23
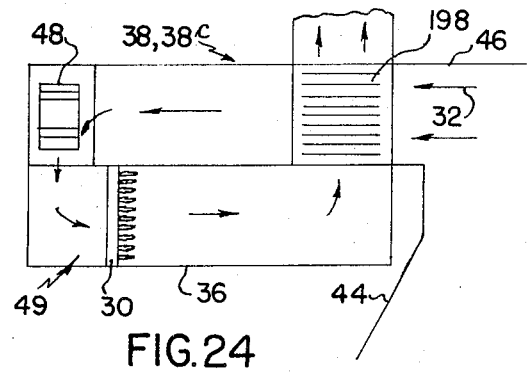
FIG.24
INVENTOR
THEODORE E. DAVIES
BY
Jack M. Young
ATTORNEY Aug. 18, 1970     T. E. DAVIES     3,524,632
FLAME GRID AND COMPONENT PARTS THEREOF Filed June 12, 1968     7 Sheets-Sheet 2

INVENTOR
THEODORE E. DAVIES
BY *Jack M. Young*
ATTORNEY

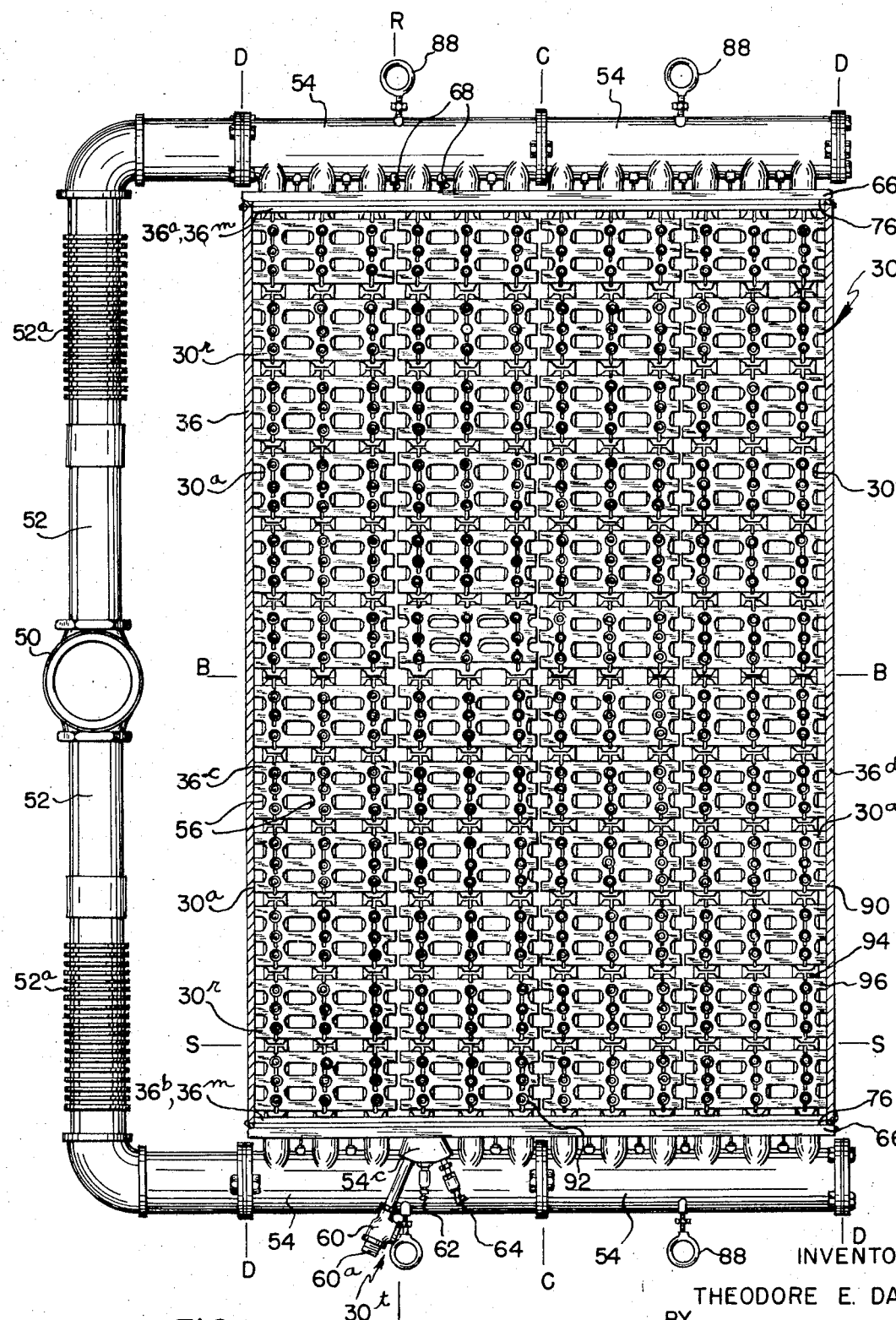

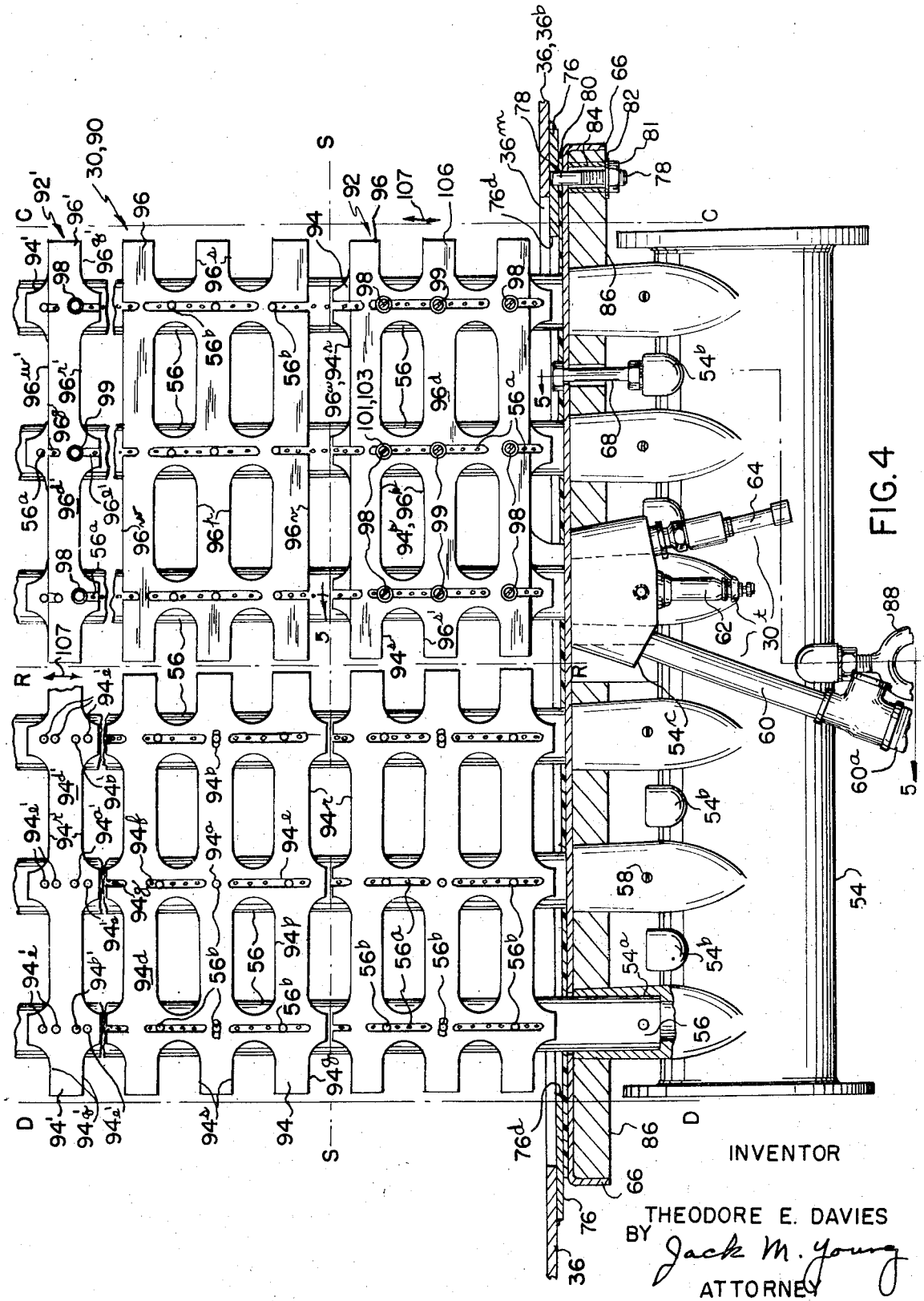

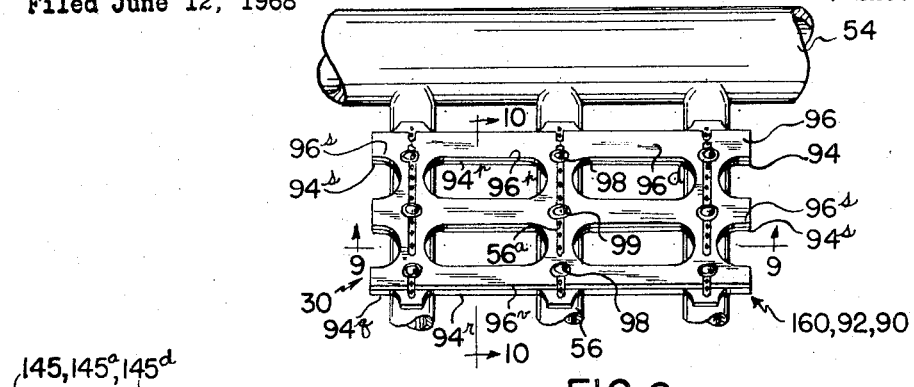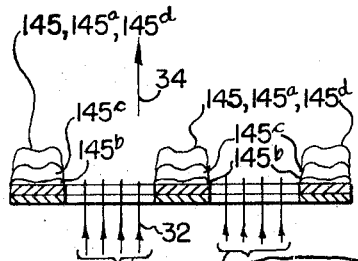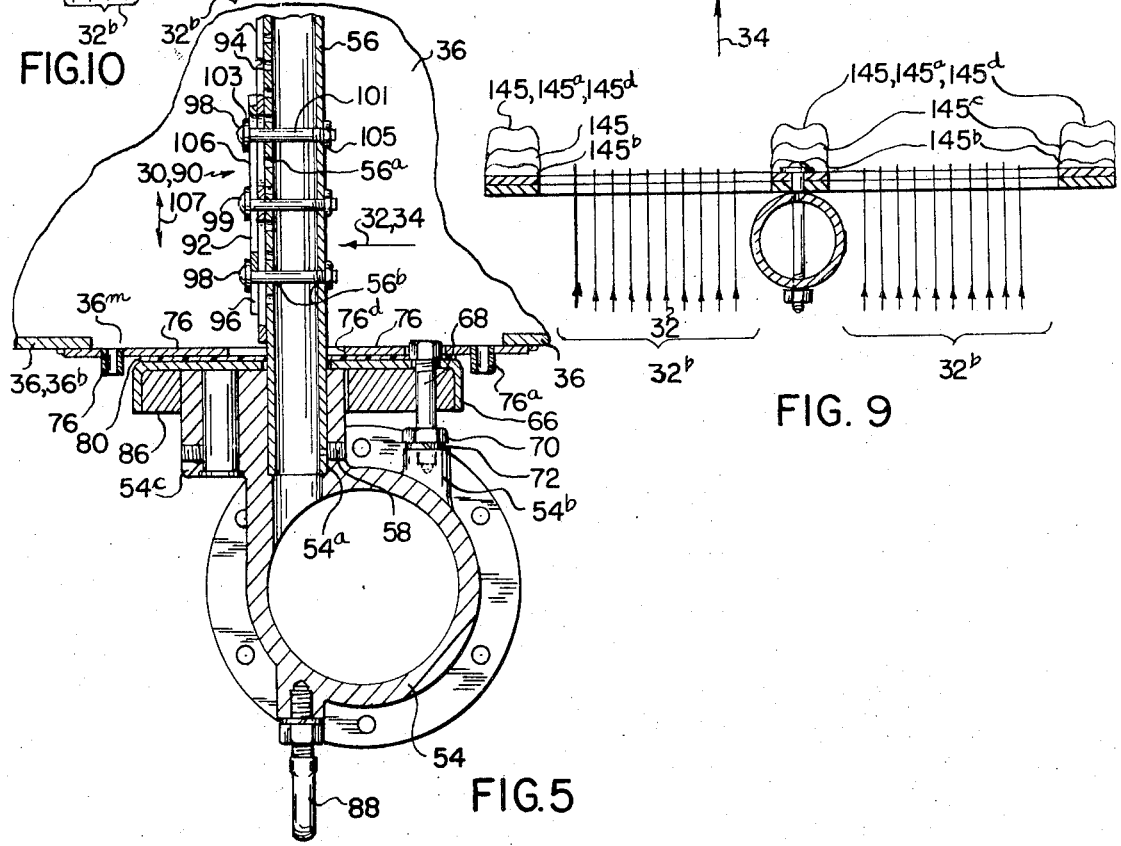

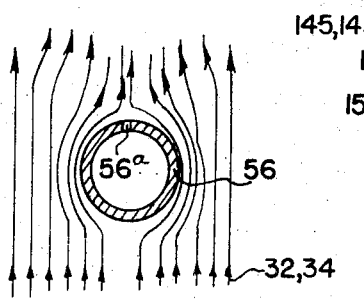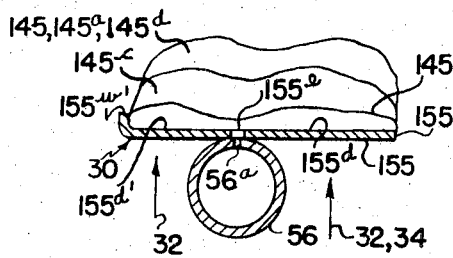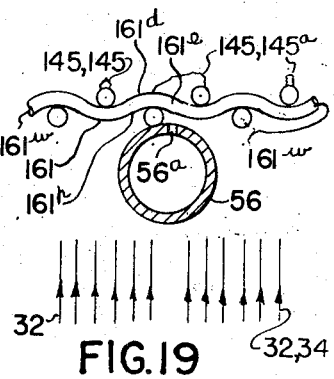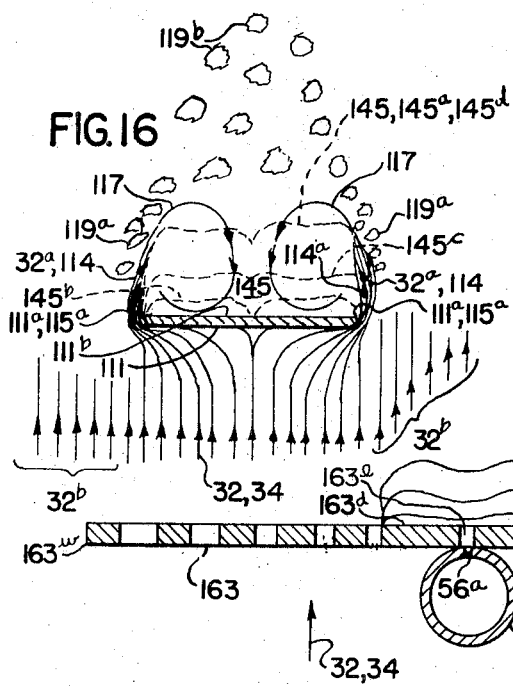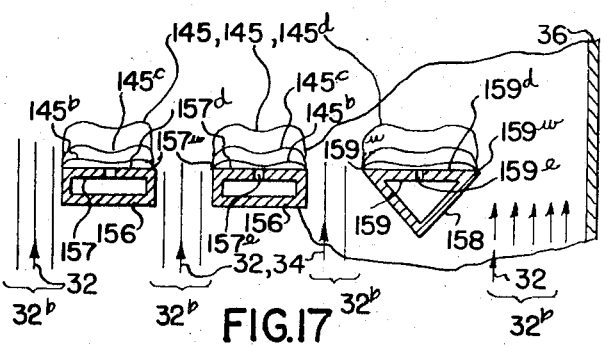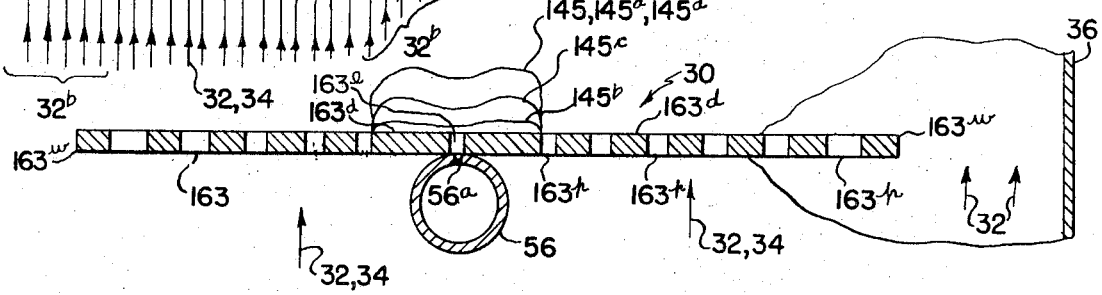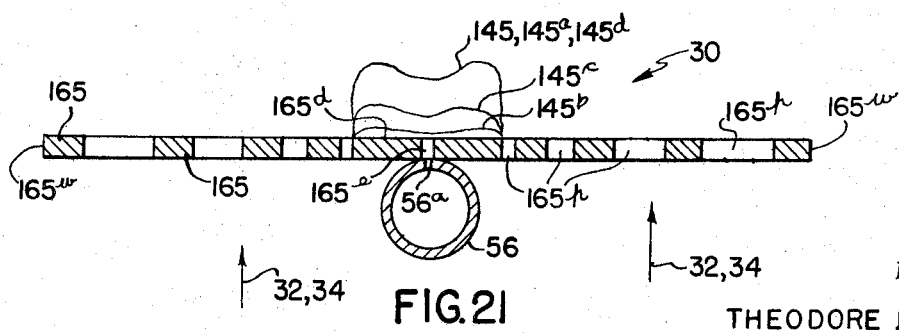

United States Patent Office 3,524,632
Patented Aug. 18, 1970

3,524,632
FLAME GRID AND COMPONENT PARTS THEREOF
Theodore E. Davies, Hudson, Ohio, assignor to The North American Manufacturing Company, Cleveland, Ohio, a corporation of Ohio
Filed June 12, 1968, Ser. No. 736,517
Int. Cl. F23l 9/04
U.S. Cl. 263—19     67 Claims

ABSTRACT OF THE DISCLOSURE

Direct-fired, flame-grid-type burners using substantially raw fuel to heat a gaseous stream, such as air or gas (either not carrying or carrying combustibles, including fumes, to be incinerated), for use in a make-up air or space heater, oven, dryer, evaporator, draw furnace, combustible incinerator, etc. with temperature rises from approximately 3° to 1500° F.; and each burner having long turn down range and plate-like portions with flow opening or edge portions for diverting some stream portions into a combustion zone on a flame holder and subsequently mixing the combustion products therefrom with all stream portions for uniform heating or incineration.

BACKGROUND AND SUMMARY OF THE INVENTION

This invention relates to direct fired burners specially adapted for incinerating combustibles in a gaseous stream and having structure and modes of operation adaptable for direct fired burners, having a temperature rise range from 3° to 1500° F. and a long turn range; and especially adaptable for use in a make-up air heater, air space heater, oven, dryer, evaporator, draw furnace, fume or combustible incinerator, etc.

Each burner of the present invention has its gaseous stream, and any combustibles carried thereby, heated as quickly as possible to the desired outlet temperature, whether it be an incineration temperature or a lower temperature, with minimum flow pressure drop across the burner to a uniform outlet temperature with an intimate mixture with the hot combustion products with the burner burning only substantially raw fuel, having minimum initial cost and minimum operating cost, and having flexible operating characteristics, and/or if an incinerator, meeting the highest incineration standards.

An object of the present invention is to provide a heater for a gaseous stream having a burner with plate-like portions constructed and arranged to divert a portion of the gaseous stream into a combustion zone on a flame holder and for subsequently mixing the hot combustion products from the combustion zone with all gaseous stream positions.

A further object of the present invention is to provide a highly efficient incinerator for incinerating both visible and invisible combustibles carried by a gaseous stream with the incineration performed by a direct fired burner in an economical manner.

A further object of the present invention is to provide in an incinerator a burner for heating a gaseous stream, and any combustibles carried thereby to be incinerated, as quickly as possible to incineration temperature with minimum flow pressure drop across the burner and with uniform outlet temperature of intimately mixed gaseous stream portions and combustion products with the burner preferably operating on substantially raw, or raw, fuel.

A further object of the present invention is to provide a burner having shutter means providing a plurality of desirable functions and controlling gaseous stream flow through and mixing by the burner.

A further object of the present invention is to provide a generally flat surface portion, carried by a fuel pipe in a direct fired gaseous stream heater, having flow edge opening portions therein to permit passage of the gaseous stream past the burner and having down stream surface portions holding or stabilizing the flame during combustion.

A further object of the present invention is to provide a burner of one of the aforementioned constructions adaptable to be used in either one form, or suitably modified form following the principles disclosed herein, for any temperature rise in a large temperature range from 3° to 1500° F.

A further object of the present invention is to provide a burner characterized by its low initial and operating costs, inexpensive manufacturing costs, ease of assembly of its component parts, structural simplicity, compactness on disassembly for shipping, strong and sturdy nature, superior operating efficiency, ease of operation or use, ease of adjustment, multiplicity of functional advantages for some component parts thereof, and/or overall economy.

These and other objects, novel features and additional advantages of the present invention will become more clearly apparent by reference to the appended claims as the following detailed description and discussion proceeds in conjunction with the accompanying drawing.

BRIEF DESCRIPTION OF THE DRAWING

In the drawing,
FIG. 1 is a side elevational view of an apparatus using the flame grid or burner of the present invention as a direct fired incinerator (non-catalytic and non-recuperative type) in the exhaust duct from an oven or other source of gaseous stream containing combustibles with the flame grid shown schematically in the duct;

FIG. 3 is a transverse sectional view through a duct taken generally along the line A—A in FIG. 1 or FIG. 2 but of a large size flame grid or burner of the present invention and looking at the downstream side of the flame grid, as viewed in the upstream direction, with the fuel discharge ports omitted and bolt heads and washers enlarged because of the smallness of the structural scale in FIG. 3;

FIG. 4 is an enlargement of a portion of the flame grid or burner in FIG. 3 with some plates omitted for purposes of description, as described hereafter;

FIG. 5 is a longitudinal sectional view taken generally along the line 5—5 (partially along each line 5—5 upper branch) in FIG. 4 through a portion of the flame grid and omitting the flame observation port, spark igniter and flame detector shown in the lower portion of FIG. 4;

FIG. 6 is a perspective view of a portion of the flame grid in FIG. 4 showing more clearly the relationship between the component parts thereof and having portions of the fuel manifold simplified for purposes of illustration;

FIG. 9 is a sectional view taken generally along the line 9—9 in FIG. 6 through the flame grid and showing only one fuel pipe, the gaseous stream flow therethrough, and the combustion zone thereon;

FIG. 10 is a sectional view taken generally along the line 10—10 in FIG. 6 through the flame grid omitting the fuel pipe, and showing the gaseous stream flow therethrough and the combustion zone thereon;

FIG. 11 is diagrammatic views of the relative rate of lateral dispersion of ink in a flowing fluid wherein the ink is supplied from a single, a few, or many point sources to illustrate relative rates of, and rapid, mixing by lateral dispersion of the combustion products in development of the flame grid or burner in the present invention with the gaseous stream flowing therepast;

FIGS. 12, 13 and 14 are schematic views of stream flow ducts having respectively single flame, triple flame, and multiple flame (flame grid or burner of the present invention) fluid fuel burners for directly heating a flowing gaseous stream as a gaseous stream heater or incinerator with these drawing figures being used to explain the theory and evolution of the burner in the present invention;

FIG. 15 is a sectional view of the fuel pipe in FIG. 9 without any grid thereon and showing one form of flow action of the gaseous stream thereover when the flame holder of the present invention is not used;

FIG. 16 is a side elevational view of one form of flow stream wake created by a flat plate; and FIGS. 17, 18, 19, 20 and 21 illustrate many different modifications of the flame holder and gas pipe construction shown in FIG. 9 adapted to be used in modified forms of the burner or flame grid in the present invention; and including respectively gas pipes of rectangular and triangular cross sections; a single, solid, flame holder plate with one turned up edge; a screen as a flame holder; and perforated plates having different percents open therealong.

FIGS. 23 and 24 diagrammatically show constructions for reducing fuel costs of the burner or flame grid, especially when used in an incinerator, with FIG. 18 showin a catalytic-type and FIG. 19 showing a recuperator-type (with heat exchanger) incinerator.

DETAILED DESCRIPTION OF THE PREFERRED EMBODIMENTS

Figure 22:
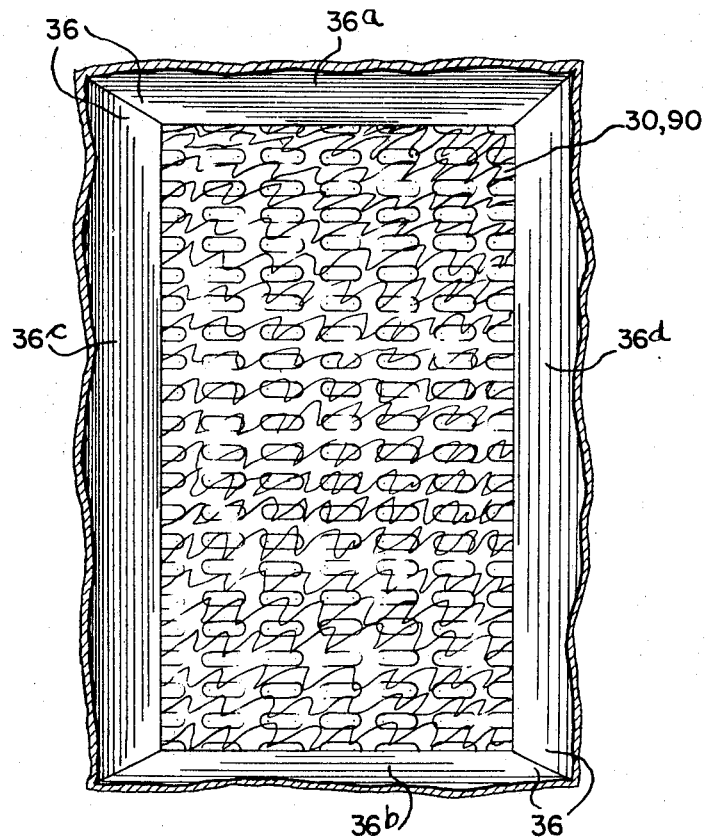
FIG. 22 is a sectional view taken generally along the line A—A in FIGS. 1 or 2 looking at the downstream face of a burner or flame grid of the present invention smaller than that shown in FIG. 3 and portraying a blanket of flame over the flame grid during its operation with the gaseous stream holes spaced there across being lightly shown as they are visible through the blanket of flame.

In the drawing, direct fired, fluid fuel burner 30 directly heats flowing gaseous stream 32, capable of supporting combustion, flowing in downstream direction 34 in duct 36 past or through burner 30. This burner 30 will also be called herein a flame grid because of its semblance to a flaming grid in FIGS. 3 and 22, for example.

The reference numeral 30 has been applied generically to all burners disclosed herein, not only the specific one shown in detail in FIGS. 4–10 but also various modifications thereof shown in FIGS. 17–21 of the drawing, and the specific one under discussion will be identified by figure number where appropriate unless the reference number 30 is intended to be generic to all forms of the burner disclosed. Reference number 30 will most frequently be used to refer to incinerator burner 30 in FIGS. 3–10.

Figure 2:
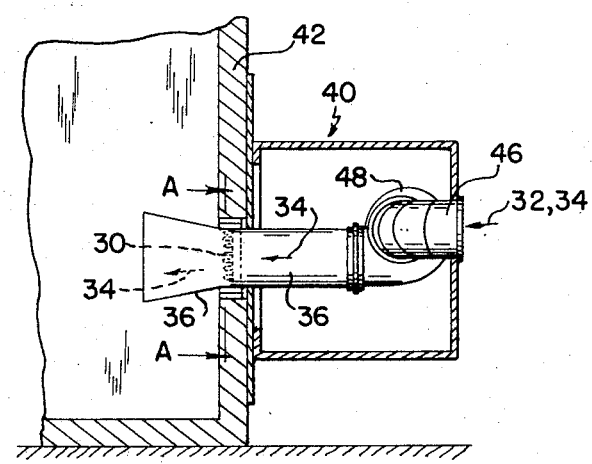
FIG. 2 is a side elevational view, partially in section, having the flame grid or burner of the present invention in a duct of a direct fired gaseous stream (such as air) heater with the flame grid shown schematically.
Figure 7:
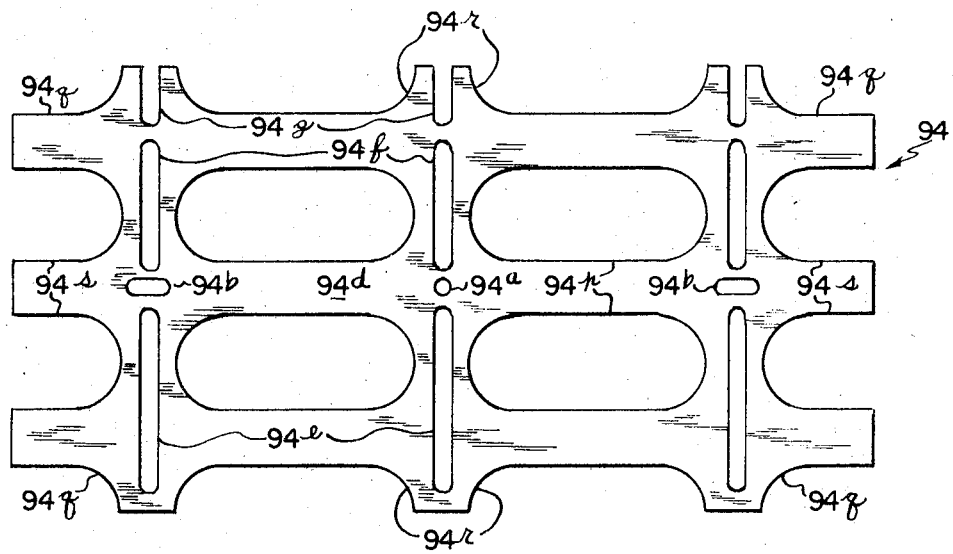
FIG. 7 is a top plan view of a bottom plate in the flame grid and a shutter in FIG. 4.
Figure 8:
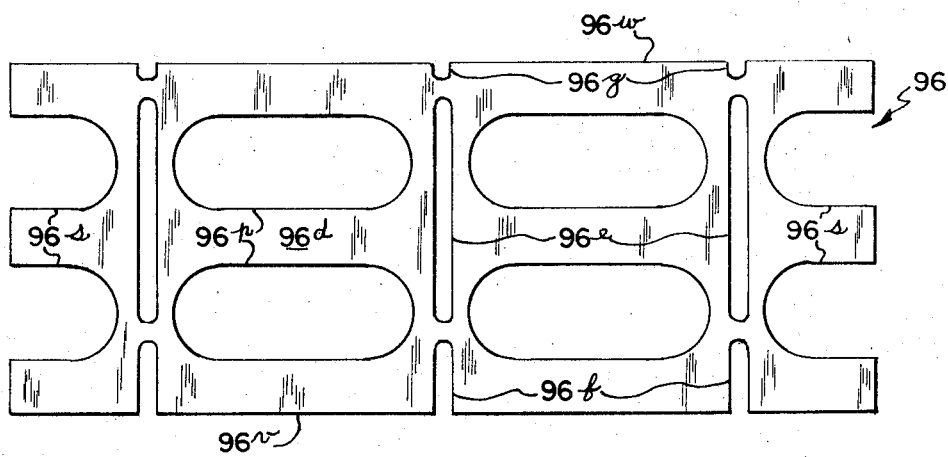
FIG. 8 is a top plan view of a top plate in the flame grid and a shutter in FIG. 4.

Burner 30 may be mounted in any one of a variety of positions, including extending across horizontal, vertical-up, or vertical-down ducts 36, with a vertical-up duct installation being shown in FIG. 1 and a horizontal duct installation being shown in FIG. 2 of the drawing.

Burner 30 has many uses, including two major uses as: (1) a disposer of fumes by direct fire incineration, such as by being mounted in exhaust duct 36 in FIG. 1, 23 or 24 to provide an exhaust duct incinerator 38; and (2) a direct-fired gas (such as air) heater of general utility, as shown as mounted in duct 36 of such gas or air heater 40 in FIG. 2 of a through-the-wall 42 heater 40. Hence, burner 30 is adapted to raise the temperature of gaseous stream 32 over a wide range from as low as 3° F. for a space or make-up air heater 40 to as much as 1500° F. for incinerator 38 for consuming combustibles to eliminate air pollution. In practice, it is possible to obtain anything from a 3° F. to 1500° F. temperature rise in gaseous stream 32 as it flows across burner 30, depending upon the design of burner 30. Gaseous stream or air heater 40 covers a wide range of temperature output from 3° F. up to the incineration temperature. This includes at lowest temperature rise of 3–70° F. as a space heater or make-up air heater. In between these temperature extremes, gaseous stream heater 40 may raise the temperature of the gaseous stream 32 100–500° F. for ovens and dryers in process heating, heating product, or evaporating water; and 800°–1200° F. in draw furnaces and for heating metals for metallurgical purposes.

Since it may not be possible for one burner 30 to cover this large temperature range, the description herein will cover the supposed theory of operation and the structural and operational factors effecting the desired combustion, temperature rise, flame holding, gaseous stream diversion to combustion, and subsequent mixing of the combustion products with the gaseous stream to give the desired temperature rise.

As far as possible, the description will try to cover this field by sequentially giving some background for explanation and then describing the specific structure shown of burner 30 in drawing FIGS. 3–10; the theory of operation in FIGS. 15 and 16 believed to occur in this complex phenomena of combustion, flame holding, gaseous stream flow, mixing; explaining some modifications of burner 30 in FIGS. 17–21; explaining some structural and operational factors affecting each so as to better understand or to best get a burner having the mode of operation desired; the action of shutters 160 in grid 90 in FIGS. 3, 4, and 5; the objects and relative advantages obtainable by burner 30; and methods of reducing fuel costs in FIGS. 23 and 24.

Several types of exhaust duct incinerators, described generically herein as incinerator 38, are illustrated, including catalytic and non-recuperator type incinerator 38a in FIG. 23; non-catalytic and non-recuperator type incinerator 38b in FIG. 1; and non-catalytic and recuperator-type incinerator 38c in FIG. 24 respectively requiring an incineration temperature approximately 800° F., 1400° F. and 1400° F. at the outlet of burner 30 for proper operation. Since burner 30 in FIGS. 3–10 may be used in any incinerator 38 if proper outlet incineration temperature is obtained, the discussion will primarily relate to burner 30 and generic incinerator 38 unless the specific catalytic, non-catalytic, or recuperative type is specifically mentioned.

In each incinerator 38, burner 30 is a substantially raw fuel burning, burner or flame grid 30 extending directly across exhaust duct 36 for consuming by direct flame incineration or thermal incineration the combustibles in stream 32 traveling in duct 36 from a source of combustibles, such as either oven or other industrial process under hood 44 in FIG. 1, so stream 32 exhausts from the outlet end of duct 36 as clear, clean, non-offending exhaust gas, including air. Burner 30 serves as a positive means for direct incineration of combustibles, including organic vapors and fumes, in the exhaust gases and air from hood 44 so as to serve as a combustible or fume destructor to remove these combustibles from stream 32.

Hood 44 represents any suitable source of combustibles, hereafter described as including fumes, organic vapors, molecular, particulate, etc. matter in stream 32. Hood 44 represents any manufacturing processes using any commercial solvents of any types with these processes including drying, curing or baking in ovens, kilns or dryers. Some examples are painting, decorating or coating ovens giving off paint or solvent vapors; wire coating ovens; foundry core baking ovens; solvent degreasers; automobile body undercoating ovens; brake lining ovens; and printing presses. Organic solvents vaporized in such processes contain various hydro-carbons including aldehydes, ethers, esters, alcohols, aromatic compounds, ketones, etc. Some other processes exhausting stream 32 from hood 44 with combustilbles therein include varnish kettles, rendering cookers, oil or wax extractors, coffee roasters, etc.

Each heater 40 in FIG. 2 and incinerator 38 in FIG. 1, 23 or 24 includes fan or blower 48 for sucking gaseous stream 32 through intake duct 46 and discharging it through discharge or exhaust duct 36 while it travels through flame grid or burner 30 disposed across, or crosswise, in duct 36 on either the suction or discharge side of blower 48. However, it should be apparent for the purposes of the present invention that gaseous stream 32 may be caused to travel through duct 36 by inspirator, natural draft, or fan or blower 48. In a space or make-up air heater 40 illustrated in FIG. 2, gaseous stream 32 sucked into the building is ambient air. In incinerator 38b in FIG. 1 and incinerator 38c in FIG. 24, exhaust duct 36 is preferably refractory lined downstream from burner 30 if the 1400° F. temperature is used.

In each form of the present invention, gaseous stream 32 comprises air, including oxygen capable of supporting combustion, in heater 40 or comprises oxygen and combustibles (generally carried in air or other gases) capable of supporting combustion in incinerator 38 for oxidizing the combustibles so as to exhaust non-polluted gas from the discharge upper end of duct 36 thereof. Hence, stream 32 is always an oxygen bearing gaseous stream as it travels through burner 30, even if additional oxygen has to be added thereto (as will be brought out hereinafter), to support the necessary combustion on burner or flame grid 30.

"Combustibles" and "combustible," as used herein, is defined as including any air contaminant, including any/and all particulate (solid) matter and molecular or non-particulate matter, consumable by direct flame incineration. These include organic vapors, fumes, exhaust or effluent exhausting through duct 36 from hood 44 in FIG. 1. These air contaminants fall in two major groups: particulate matter and non-particulate matter. Particulate matter includes soot, fly ash, smoke, carbonaceous and fall-out particles. Incinerator 38 is intended to remove by direct flame incineration any of these particles, where combustile, even though some of these particles are frequnetly removed by filters, electrostatic precipitators, dust collectors, scrubbers, etc. Particulate matter includes particles having weight, shape and dimension; and non-particulate matter includes molecular material, generally in a gas or fume form when discharged from hood 44 and indefinite in shape and dimensions. These include carbon monoxide, gaseous hydrocarbons, and other incompletely burned oxides, volatile elements, and other obnoxious ingredients in urban smog, such as photochemically reactive molecules that may become exceedingly toxic when exposed to light. Incinerator 38 is intended to remove these molecular and non-particulate matters from exhaust stream 32 even though they may be invisible to the eye in stream 32.

Fluid fuel fire burner 30 may burn any suitable fluid fuel at standard pressures. These fluid fuels include gaseous fuels, including natural gas, propane, butane, manufactured gas, etc.; and any other suitable fluid fuel, whether the fluid be liquid or gas. Burning of substantially raw fuel is preferred. "Substantially raw fuel" includes not only raw fuel but also any rich mix (not aerated to over 30% of the stoichimetric amount, i.e., not having over 30% of the air with oxygen required for perfect combustion of the fuel). Burner 30 is disclosed herein as designed and described as intending to be operated on "substantially raw gas" (being the gas type fuel in the above defined substantially raw fuel) and especially on raw gas (non-aerated), such as natural gas, supplied under pressure and in unaerated condition just as it comes from gas mains or supply. Then, burner 30 operates on the raw gas with no oxygen supplied thereto other than in flowing gaseous stream 32 in which burner 30 is disposed. Then, stream 32 in incinerator 38 must be an oxygen bearing gas having an oxygen content of at least 12% by volume of stream 32 (including combustibles) upstream of burner 30. It should be apparent that even burning a rich fuel mixture in burner 30 will require that a substantial portion of the oxygen for combustion be provided from stream 32 to obtain the stoichiometric mixture for combustion.

If flowing gaseous stream 32 does not have sufficient oxygen to burn the raw gas completely at fuel ports 56a in combustion zone 145, as described in more detail hereinafter, and subsequently to incinerate all of the combustibles in stream 32, suitable means should be provided for adding oxygen, such as in the form of air, upstream of burner 30 into gaseous stream 32 flowing through duct 36 so as to have sufficient oxygen for combustion zone 145 and for oxidizing and incinerating all of the combustibles. This can be done by insertion of additional air through a port upstream of burner 30, as shown by arrow 49 in FIGS. 1, 23 and 24.

There are numerous advantages to burning substantially raw gas, including raw gas or a rich mixture, in burner 30. The initial cost of burner 30 is kept to a minimum since no expensive air premixer or air blower is required for aerating the fuel, such as the natural gas described herein. Also, cheaper fuel pipes can be used because they are of smaller size since only a smaller volume of raw or substantially raw fuel is carried thereby instead of a 100% aerated stoichiometric fuel mixture. Also, since the fuel pipes are of smaller size, they: (1) cause less obstruction to flow to stream 32 so that a smaller duct 36 may be used to convey a given velocity and volume gaseous stream 32, (2) permit the installation of a larger capacity burner 30 in a given size duct 36, and (3) permit more rapid mixing and a higher and more uniform temperature to be obtained (desirable for incinerator 38) since the fuel pipes, and consequently their flames, are spaced closer together. This provides maximum heat, maximum flow of stream 32 and maximum mixing of the products of combustion with stream 32 in minimum transverse flow area and length duct 36. Hence, it is respectfully submitted that the most practical way to obtain an incinerator 38 or gas stream heater 40, of any desired temperature rise, is to burn raw fuel, preferably gas, in burner 30 directly in flowing gaseous stream 32, whether it be clean air or loaded with combustibles.

Some of the terms used herein have been earlier described in this detailed description and other terms will be described later in this detailed description under the heading "Some Terminology" to which reference may be made at this time, if desired.

(a) General construction of burner 30 and its gas supply lines in FIG. 3

Burner 30 in FIGS. 3–10 is used in large duct 36 in FIG. 3, and will be so described in detail hereinafter.

Duct 36 is shown in FIG. 3 in transverse section as being rectangular in cross section formed by top wall 36a, bottom wall 36b, and side walls 36c and 36d. This large duct 36 in FIG. 3 has a rectangular flow opening between these walls of about 72 inch by 48 inch.

Quick inspection of FIG. 3 will reveal that burner 30 has grid 90 made up of a plurality of frequently repeated modular full grid components 92 (each comprising one pair of superimposed plates 94 and 96) built up in the description hereinafter into four burner quarter sections 30a further enlarged into two burner half sections 30r of burner 30 forming complete grid 90; so it should be apparent that any one or more of these modular components, quarter sections or half sections, may be used in generally the same manner for permitting burner 30 to form a smaller grid 90 to be used in duct 36 of smaller cross section or different rectangular shape. Full grid component 92 and partial grid component 92′ are shown respectively in the lower and upper right hand portions of FIG. 4, and comprise respectively one pair of parallel or superimposed plates 94 and 96 or 94' and 96' and at least one fuel pipe 56 extending along the center thereof, although being specifically shown in FIG. 4 as being mounted on three parallel fuel pipes 56. One such grid component is shown in FIGS. 3 and 4 as being bounded by section lines C—C, R—R, and S—S.

Now, burner 30 in FIG. 3 will be described in general details.

Main fuel line 50 in FIG. 3 supplies one or more burner manifold sections 54 (shown as four in number in FIG. 3) with fuel, such as natural gas, through one or more branch lines 52 (shown as two in number in FIG. 3, comprising elbows and straight sections, and being corrugated at 52a for permitting expansion) with these fuel line components 50 and 52 and manifolds 54 screwed or bolted together in any conventional manner.

Quick inspection of FIG. 3 will reveal that burner 30 is composed of four burner section 30a (each occupying about one-quarter of the space between lines D—D and D—D and occupying one of the quarters defined by lines B—B and C—C) and of two half sections 30r (each comprising two quarter sections 30a with one-half section located above and the other below line B—B) for convenience of assembly, as will be brought out in more detail hereinafter. Each section 30a or 30r is substantially identical but a mirror image of its corresponding section except for the addition of ignition and safety assembly 30t (located in the lower left portion of FIG. 3) added to one of these quarter sections 30a, as will be described hereinafter. Each quarter section 30a has one of the burner manifold sections 54 therein, serving as the backbone thereof, visible from outside duct 36 in FIG. 3, and feeding flame grid or burner 30 with fuel through multiple fuel ports 54a in parallel pipes 56, as will be described hereinafter.

Since each burner section 30a is substantially identical in construction and a mirror image of any of the other three burner quarter sections 30a in FIG. 3, the specific structure of only one section 30a will be described in FIGS. 3, 4 and 5. Each manifold section 54 has a plurality of parallel, counter bored holes 54a therein each detachably receiving and connected to fuel pipe 56 locked in position by dog point set screw 58 and having fuel ports or jet nozzles 56a drilled through the wall of pipe 56 in series alignment along the length, or spaced lengthwise along approximately the full length, of pipe 56. Hence, fuel pipes 56 in the four burner quarter sections 30a provide for burner 30 fluid fuel supply pipe means extending across substantially the full transverse area of flowing gaseous stream 32 and the interior of duct 36 as parallel pipes 56.

At least one of the burner quarter sections 30a in burner 30 in FIG. 3 includes ignition and safety assembly 30t shown in FIG. 4 and at the lower left in FIG. 3 and having any suitable conventional construction or features. Assembly 30t has secured in holes in integral boss portion 54c of one of the manifold sections 54 by set screws three tubes comprising: raw gas pilot 60 having observation port 60a therein permitting sighting from outside duct 36 the flame blanket on the downstream side of flame grid or burner 30; spark ignitor or electrode 62; and flame rod or ultra-violet type flame monitoring device 64 for monitoring the flame on the surface of the burner, rather than on the pilot. Assembly 30t is preferably operated as an interrupted type, spark ignited, raw fuel (such as natural gas) pilot 60 so that pilot 60 goes off for safety purposes after the main burner ignites. Then, after ignition of the fuel in pilot 60 by electrodes 62, the flame of pilot 60 ignites the main burner portion of burner 30 after the pilot flame is detected by flame rod 64 to open the main fuel valve and to admit, and to ignite, fuel in pipes 56 in the main burner portion of burner 30. Then, flame rod 64 detects this main burner flame, turns off pilot 60 and protects by any suitable safety device in response to presence of the main burner flame, rather than the pilot flame. Any suitable automatic temperature controls of a conventional nature may be used, if desired, to turn on and off fuel to main burner fuel pipes 56 to control the output of burner 30.

(b) Mounting burner 30 in duct 36 in FIG. 3

Burner 30 is readily mounted within duct 36 in FIG. 3 by having the burner manufacturer supply the burner in component sections and having either the manufacturer or customer mount it in duct 36.

The burner manufacturer may provide burner 30 in FIG. 3 in two burner half sections 30r with one having ignition and safety assembly 30t thereon. Each half section has its two manifold sections 54 mounted on a common burner mounting plate 66 by a plurality of bolts 68 spaced along the length of plate 66 (only one bolt 68 being shown in FIGS. 4 and 5) with each screwed into a threaded hole in boss 54b of manifold section 54 and locked therein by nut 70 and lock washer 72 tightened up thereon.

Now, two burner half sections 30r are ready to be mounted in duct 36 by either the customer or burner manufacturer. For mounting big burner 30 in large duct 36 in FIG. 3, it is necessary to cut axially aligned cutouts 36m (coplanar in the plane of drawing FIG. 3, extending across duct 36, and having a length extending the full distance between the inner faces of walls 36c, 36d) in duct walls 36a and 36b in FIGS. 3, 4, and 5 for mounting one burner half section 30r through each such cutout slot 36m.

Now, two duct mounting plates 76 with one mounted over each of these slots 36m by being lapped over duct side wall 36a or 36b. Then, each plate 76 is continuously welded about its periphery to duct wall 36a or 36b to completely close slot 36m associated therewith. If desired, instead of lapping duct side wall 36a or 36b as described, each plate 76 may be cut to fit its associated slot 36m and then be continuously welded in coplanar alignment with duct side wall 36a or 36b to provide a substantially smooth inside duct wall by duct wall 36a or 36b and associated plate 76. At least one plate 76 has upstream pressure tap 76a and downstream pressure tap 76b in FIG. 5, if desired, for measuring the pressure drop across burner 30 of flowing stream 32 in any conventional manner. Each plate 76 has slot 76d cut therein in FIGS. 4 and 5 through which the portion of burner half section 30r within duct 36 may be telescoped into the position shown in FIGS. 3, 4 and 5; and has welded thereto and projecting therefrom a plurality of studs 78 spaced along the length of plate 76 and threaded at their outer ends with only one stud 78 being shown in FIG. 4. Before each burner half section 30r is telescoped through its slot 76d, a suitable sealing cement 80, such as Permatex, is spread over the outer face of each plate 76 to provide a seal with plate 66 in final assembly against discharge of any portion of hot gaseous stream 32 therethrough and out duct 36 in final assembled position. Burner mounting plate 66 for each half burner section 30r is secured to plate 76 at each stud 78 by nut 81 screwed onto stud 78 and pressing washer 82, sleeve 84 and burner mounting plate 66 (telescoped over stud 78) into firm contact with duct mounting plate 76 to form good seal 80 thereat. Suitable insulation 86, such as Kastolite, poured and troweled to the heighth of the dished recess in burner mounting plate 66, is provided to cut down heat conduction or radiation from burner 30 within duct 36.

Now, two branch lines 52 can be connected between the left end of the left hand burner manifold section in FIG. 3 and main fuel lines 50 to complete the installation of burner 30 in duct 36 in FIG. 3.

Each half burner section 30r may be removed from duct 36, if necessary, for servicing by following the reverse of the above description.

Now, burner 30 in FIG. 3 is ready for operation. No more than one-eighth inch clearance need exist between grid 90 in FIG. 3 and the inner surface of duct walls 36c and 36d and the other duct walls formed by duct mounting plates 76 for ease of assembly of burner 30 within duct 36 so that grid 90 of flame grid or burner 30 fits snugly within, and extends across the full cross sectional interior area of duct 36 through which stream 32 flows. As burner 30 operates, it is fired by fluid fuel, such as natural gas, flowing sequentially from main fuel line 50 in FIG. 3 parallel through each branch line 52 into aligned burner manifold sections 54 in each burner half section 30r and then in parallel through the plurality of parallel fuel pipes 56 to be exhausted through their fuel ports 56a in FIGS. 4, 5 and 9 to form a blanket of flame on the downstream side of grid 90 of flame grid or burner 30.

It should be apparent that a smaller flame grid 90 and burner 30 may be constructed and mounted in a smaller duct 36 than that shown in FIG. 3. For example, a one-quarter size burner 30 can be mounted in a duct having one-quarter of the flow area of duct 36 in FIG. 3 by using only one of the quarter burner sections 30a, such as the lower left one in FIG. 3 having ignition and safety assembly 30t thereon, with only one burner manifold section 54, as shown partially in FIG. 4; and duct mounting plate 76 and burner mounting plate 66, each of slightly more than one-half the size of any one of these two so numbered plates in FIG. 3. Then, only one mounting slot 36m, about one-half the length of one of the two slots 36m in FIG. 3, need be but in duct 36 to accommodate the selected burner quarter section 30a needed to be inserted through the slot from only one side of duct 36. In similar manner, one of the burner half sections 30r can be inserted through single duct slot 36m in FIG. 3 into a duct 36 of one-half the flow cross sectional area of duct 36 in FIG. 3. It should be apparent that this same principle of construction and assembly can be used for a section of burner 30 having only one grid component 92 (or even smaller partial grid component 92' described in the next section of this specification) formed as small as the area in FIG. 3 between lines C—C, R—R and S—S wherein grid component 92 is formed of only one pair of super-imposed plates 94 and 96 to form full grid 90 and at least one gas pipe 56 with a correspondingly shortened form of burner manifold section 54.

Hence, any grid 90 is made up in modular form of many substantially identical grid portions 92 so as to comprise many plates 94 and 96 and gas pipes 56. All plates 94 and 96 are identical in construction, and pipes 56 in different size burners 30 are merely tubes of either different number and/or cut to different lengths. Hence, detachable pipes 56 and plates 94 and 96 permit modular build up of any size burner 30 for any size rectangular duct 36. This modular construction permits burner 30 to be adapted to a wide variety of sizes and shapes of duct 36 by using standard component parts repeatedly used in larger burners 30. Basically, this grid component 92 and this small burner section, bounded by these C-R-S lines, is shown in FIGS. 4 and 5 and will be the component described in more detail hereinafter since basically it is merely repeated to form large burner 30 in FIG. 3. For example, burner 30 may be formed with grid 90 in size ranging from 6 inches by 12 inches (enclosed within lines R—R, S—S and C—C) to 72 inches by 48 inches shown in FIG. 3 so as to be able to make burner 30 of any suitable grid design for fitting any rectangular duct having interior dimensions in any six inch multiples between these two extremes.

Screw eye 88 may be screwed into each burner manifold section 54 in FIGS. 3, 4 and 5 to permit handling by a crane or other lifting device, burner 30, or any section 30a or 30r thereof, during mounting into, or disassembly from, duct 36.

(c) Specific structure of grid 90 and each of its grid components 92 and 92'

Grid 90 is formed of a plurality of full grid components 92, as shown in FIGS. 3, 4, and 5, and many include one or more partial grid components 92'. In FIG. 4, each full grid component 92 comprises a pair of plates (bottom plate 94 and top plate 96) and each partial grid component 92' comprises a pair of plates (partial bottom plate 94' and partial top plate 96') arranged in superimposed or parallel layers and connected together and to their associated fuel pipe 56 by one or more connecting means 98 or 99, each comprising bolt 101, washer 103 and nut 105 in FIG. 5.

FIG. 4 has some of these plates 94, 94', 96, and 96' omitted for purposes of illustration. Only full grid component 92 in the lower right hand corner and partial grid component 92' in the upper right hand corner of grid 90 are complete, and each has both bottom and top plates, here shown as plates 94 and 96, and partial plates 94' and 96'. Between grid components 92 and 92' on the right hand side is shown only one top plate 96. The left hand side shows sequentially upwardly only two bottom plates 94 and then only partial bottom plate 94'. Partial top plate 96' is adapted to be secured over partial bottom plate 94' and these plates 94' and 96' may be any desired vertical dimension less than 6 inches in FIG. 4 to complete the grid design across any duct of uneven dimension, such as not a multiple of 6 inches, so as to complete the grid pattern across the duct with these partial plates 94' and 96' arranged in superimposed or parallel layers in the same manner as plates 94 and 96 to be described now.

All plates 94, 94', 96 and 96' are preferably made of stainless steel so as to withstand the normal effects of high temperature and corrosion in burner 30.

The slots, holes, notches, straight edges and surfaces of corresponding plates 94, 94', 96, and 96' will be given similar reference numbers (differing only in prime and/or unit designation) since they have corresponding functions in FIGS. 3–8. Each bottom plate 94 has mounting screw hole 94a and two mounting screw slots 94b; top surface 94d (facing in down stream direction 34 in burner 30 mounted in duct 36); fuel flow slots, including long slots 94e, intermediate length slots 94f, and short slots 94g; stream flow slots 94p; and stream flow notches 94q, 94r and 94s. Long and intermediate slots 94e and 94f are not only fuel flow slots but also mounting screw slots. Corresponding components are shown on partial bottom plate 94' having top surface 94d', mounting screw holes 94a' and 94b', fuel flow holes 94e', and stream flow notches 94q' and 94r'.

Top plate 96 includes top surface 96d (facing in down stream direction 34 in burner 30 mounted in duct 36); fuel flow and screw slots, including long slots 96e, intermediate length slots 96f and short slots 96g; and stream flow slots 96p, stream flow notches 96s, and stream flow straight edges 96v and 96w. Partial top plate 96' has corresponding functions and has top surface 96d', fuel flow and mounting screw long slots 96e', fuel flow short slots 96g', stream flow notches 96q' and 96r', and stream flow straight edge 96w'.

Suitable connecting means or securing means 98 or 99 is provided for detachably connecting pairs of plates 94 and 96, or pairs of plates 94' and 96' together in pairs and in superimposed or parallel layers for permitting relative sliding movement between the plates in each pair across duct 36 for changing the effective flow area of any flow opening formed thereby and for detachably connecting these plates in pairs to their associated fuel pipe or parallel pipes 56. Each connecting means 98 or 99 includes bolt or screw 101 in FIG. 5 having its threaded shank telescoped through washer 103; telescoped through one of the screw slots 96e or 96f in top plate 96 or screw slot 96e' in partial top plate 96'; telescoped through mounting screw hole 94a or mounting screw slot 94b in bottom plate 94 or mounting screw hole 94b' in partial bottom plate 94'; telescoped through aligned holes 56b in opposite walls of associated fuel pipe 56; and having lock nut 105 screwed to the end thereof to secure bottom and top plates 94 and 96 in full grid component 92, or partial bottom and top plates 94' and 96' in partial grid component 92', to associated fuel pipe or pipes 96. Bolt 101, washer 103 and nut 105 assembled together form either connecting means 98 adapted to loosely hold its superimposed plates together in a fixed position of its lock nut 105 or connecting means 99 adapted to be tightened to lock top plate 96 or 96' in any given position of movement in the direction of adjustment direction arrow 107. It should be apparent that when connecting means 99 is loosened, top plate 96 or partial top plate 96' can be moved in either direction relative to fixed bottom plate 94 or partial bottom plate 94' in view of the elongation of screw slots 96e and 96f in top plate 96 or of screw slot 96e' in partial top plate 96' and the distance or space 109 between, or spaced apart in relationship of, coplanar top plates 96 and 96' in the top layer of plates and in adjacent grid components 92 and 92'. This space 109 is shown between stream flow straight edges 96v and 96w in adjacent top plates 96 and straight edges 96v' and 96w' in partial top plate 96' in the right hand portion of FIG. 4. When the desired adjustment position has been reached by movement in one of the directions of arrow 107, connecting means 99 can be tightened to clamp the superimposed or parallel plates thereof to their associated fuel pipe 56. Each full grid component 92 has six relatively loose connecting means 98 permitting this sliding movement and three center connecting means 99 for tightening the superimposed plates 94 and 96 in any given adjustment position. Each partial grid component 92' has one-third this number. Having bolts or screws 101 in connecting means 99 extend through bottom plate mounting screw hole 94a and slots 94b, or holes 94a' and 94b'; makes bottom plate 94 or 94' stationary and permits only top plate 96 or 96' to move in direction 107. The alignment and elongated construction of fuel flow slots 94e, 94f and 94g in bottom plate 94; slots 96e, 96f, and 96g in top plate 96; and slots 96e' and 96g' in top plate 96' and alignment of fuel flow holes 94e' in bottom plate 94' permits fuel, such as natural gas, to be discharged from fuel ports 96a in their associated fuel pipes 56 and to travel down stream into combustion zone 145 without having many, if any, of these ports 96a obstructed by any of these top plates in any adjustment made by movement of any top plate in direction of adjustment arrow 107. Although nine connecting means 98 and 99 are shown in FIG. 4 in each full grid component 92 (arranged in three vertical rows), it should be readily apparent that only the three in the center row are required to provide this sliding adjustment in direction 107 and clamping in any given position, and only one of these three need be a clamping connecting means 99, while the six in the two outer rows are merely provided for rigidifying the construction.

(d) General theory of combustion and mixing operation by burner 30

It must be realized that the combustion, mixing and incinerating action in burner 30 is a complex phenomenon and many different actions, and interrelated actions, are taking place simultaneously so that it is difficult to separate one from the other. However, it has been attempted herein to separate them in this description and describe the different events as if they occur sequentially. This is being done for clarity of explanation and is no sense any limitation on the invention. These comments apply not only to this section of the detailed description but also to those following sections relating to lateral diffusions; wake formation; combustion, mixing and incinerating actions; and factors affecting burner performance.

This is believed to be the basic theory of operation of burner 30.

When one considers that the theoretical flame temperature in combustion for natural gas is approximately 3600° F. maximum, it would seem that the best way to reach the desired incineration temperature, such as 1400° F. in non-catalytic incinerator 38b, would be to blow all of gaseous stream 32 in duct 36 through the combustion flame so as to be sure to incinerate all of the combustibles in stream 32. However, one soon learns that this practice will blow out the flame since the flame will only take exposure to the amount of oxygen bearing air that it needs for combustion, and either high velocity excess air or large turbulence causing too fast a mix will merely quench, or blow out, the flame. For example, the flame on fuel pipe ports 56a in FIG. 15 would be so quenched.

The combustion at the flame requires relatively low velocity air for permitting fuel ignition, flame propagation and combustion to take place thereat while preventing quenching of the flame. Adequate oxygen must be in the stream directed toward the flame for supporting combustion of the raw fuel supplied thereto by burner 30, but not a strong enough stream to quench the flame. Also, a flame holding action is desirable so that the flame won't travel off the fuel ports. However, good incineration by incinerator 38, and better design of gas or air heaters 40, requires that the hot products of combustion be quickly and thoroughly mixed with the remainder of gaseous stream 32. Only then can thorough incineration of the combustibles carried by stream 32 or uniform outlet temperature from the heater be achieved. However, this rapid turbulence or mixing for incineration is not consistent with good flame combustion.

The solution to this problem appears to be divert, or to steal, some portions of gaseous stream 32 adequate for combustion away from the main stream portions and to direct these diverted portions into a relatively quiet zone at relatively low velocities where the flame will not be quenched and the flame will hold its position so as to generate hot combustion products. These portions are called diverted portions 32a and main stream portion 32b in the explanation of FIG. 16 in a later section of this specification. Then, the combustion products are subsequently mixed, generally downstream from the combustion zone, with the main stream portions of gaseous stream 32. Hence, this now really becomes a mixing problem, instead of a heat transfer problem, to mix thoroughly the hot products of combustion into the main portions of gaseous stream 32. It will become apparent hereafter that this mixing and diffusion of hot combustion products into the rest of stream 32 is best achieved by using the FIG. 14 construction and relying on lateral diffusion of the ink in the flowing liquid stream example in duct 136c in FIG. 11. It will be apparent, as the description proceeds, that locating many combustion flames close together across the transverse area of duct 36 in burner 30 and having the maximum length flame face of these flames exposed to the flowing gaseous stream to assure maximum mixing of the combustion products from the flame into the stream will be important factors in good design of an incinerator burner 30, and for that matter for any burner 30 in any gas or air heater 40 requiring good mixing.

After the combustion products from the flame begin to mix with the remainder of gaseous stream 32, the conditions of good combustion must be observed if all the combustible in stream 32 are to be oxidized and incinerated. Three of the conditions of good combustion are called the "three T's" of good combustion, namely: time, temperature and turbulence. In addition, incineration also sometimes requires a fourth condition, normally taken for granted and this is a sufficient supply of oxygen for combustion of the combustibles in addition to providing combustion for the flame.

Consider then what one must do to burn or incinerate these combustibles. First, gaseous stream 32 must be heated to a temperature at which chemical oxidation of the combustibles will take place, commonly called the incineration temperature and being about 1400° F. for non-catalytic type incinerator 38b in FIG. 1 and about 800° F. for catalytic type incinerator 38a in FIG. 23. This is also sometimes called the auto-ignition temperature of the combustibles. Utilizing the oxygen in hot stream 32 from oven or manufacturing process under hood 44 further reduces initial and operating costs by making it unnecessary to add cold combustion air, which must be heated to the incineration temperature. Second, a sufficient supply of oxygen must be present in stream 32 to incinerate these combustibles, and this is not always automatic. Third, the hot combustion products, and the oxygen and combustibles in stream 32, must be thoroughly mixed by turbulence. This will give rapid exposure of all the combustibles to the hot combustion products. If thorough and quick mixing can be obtained without use of baffles and other flow impediments, it is possible to construct an incinerator with minimum downstream duct length, minimum pressure drop, and minimum initial cost in apparatus coupled with minimum operating cost by low fan power. If quick and thorough mixing is not obtained, a uniform temperature will not be achieved and a needlessly long dwell time will be required increasing the size and cost of the incinerator. Also, good mixing keeps maximum and average temperatures as low as possible, but up to the incineration temperautre, to reduce operating fuel cost to a minimum and to prolong burner and incinerator life. Fourth, sufficient time must then be allowed for the oxidation reaction of the combustibles to be complete by holding them at this incinerating temperature long enough to permit the chemical or oxidation to occur all the way through to carbon dioxide and water vapor. If this combustion reaction is stopped too quickly, such as by chilling, it is possible to produce products of incomplete combustion, such as aldehydes, that may be more offensive than the combustibles being consumed. This dwell time or residence time varies, but it has been found that burner 30 keeps this time to a minimum.

It is also desirable that an incinerator have flexibility of operation, such as being able to operate at all flame heights (low as well as high); simplicity of design; and stable, complete and controlled combustion.

(e) Theory of mixing by lateral diffusion

Evolution of flame grid or burner 30, and especially in incinerator 38, will be briefly described in the paragraphs hereafter by reference to drawing FIGS. 11–14.

Development of a successful burner is as much a problem of mixing the combustion products with flowing gaseous stream 32, as it is in developing a good combustion action. How to achieve thorough mixing in minimum duct length is best understood by considering in FIG. 11 the three equal-sized ducts 136a, 136b and 136c each having therein liquid stream 132a traveling in downstream direction 134a. If it is desired to disperse rapidly ink 140 in each from one or more point sources 130 of ink, it will be readily apparent that multiple point sources of ink across the duct will disperse the ink more quickly and in a shorter distance in flowing liquid stream 134a than a single point source. For example, complete mixing occurs in one-tenth the distance ($L/10$) in duct 136c when ten point sources 130 are used and in one-third the distance ($L/3$) in duct 136b when three point sources 130 are used than distance L in duct 136a when single point source 130 is used if we assume the same lateral rate of ink dispersion into the flowing stream in each of these ducts.

This same principle was applied in developing burner 30 to obtain complete mixing of the hot combustion products with the flowing gaseous stream 32 in minimum combustion chamber length, more uniform temperature, and consequently a hotter and sufficient temperature to incinerate economically, as will be apparent from consideration of the discussion hereafter of drawing FIGS. 12–14.

Assuming for the moment that there will be an excess of oxygen in the inflowing gaseous stream 130m in duct 136r, 136s and 136t in FIGS. 12, 13 and 14, it is possible to get good heating results by introducing substantially raw fluid fuel, such as raw gas, directly into the duct and burn it there as a flame for either incinerator 38 or gas or air heater 40 respectively shown in FIGS. 1 and 2, as earlier described.

This could be done with a single fuel jet from burner 130r in FIG. 12; and presumably, if enough fuel were burned, the heating or incinerating requirements would be met by flame 140r therefrom. However, with a single raw fuel jet from burner 130r, a considerable time would be required to insure that all of stream 130m would reach the desired incineration temperature, especially in view of the slow rate of lateral diffusion of the hot combustion products when one considers the ink in duct 136a in FIG. 11 requiring length L for adequate mixing. This is the type of action that one gets with a line-type burner having all the fuel jets along a single line extending across the duct, such as horizontally in FIG. 12, to give the dispersion action in duct 136a eventhough many fuel jets are arranged in series along that line.

In FIG. 13, three smaller fuel jets from burners 130s are provided in place of the single fuel jet from burner 130r in FIG. 12. Eventhough this FIG. 13 is only a sketch, it seems apparent that the bulk of gaseous stream 130m flowing therethrough, and any combustibles included therein, will reach the desired heated or incineration temperature more quickly. This construction gives several important results. First, it makes a shorter combustion and mixing chamber more practical, as can be seen by comparing mixing lengths $L/3$ and L in FIG. 11 in ducts 136b and 136a. Second, the last portion of stream 130m to be heated can be gotten up to the desired temperature more quickly so that less heat is wasted on the first portion of stream 130m. In other words, the temperature spread between the hottest and coldest part of stream 130m after it passes fuel jets from burner 130s is smaller. This results directly is a saving of fuel, and since fuel cost is the biggest stumbling block in getting someone to install burner 30 as a direct fired incinerator 38, any fuel saving is very worthwhile. Also, decreasing the temperature differential in stream 130m means lower temperatures at "hot spots" in duct 136s to provide longer life for the equipment. Also, if these multiple fuel jets from burner 130s are properly constructed, gaseous stream 130m, being used as combustion air in flame 140s, can be made to pass through flame 140s, or become part of flame 140s; and in the opinion of many, this contributes to completeness of the combustion of the offending combustibles in gaseous stream 130m.

These aforementioned factors, together with considerations of fan cost and expense of creating pressure drop, led to development of burner or flame grid 30 of the present invention, especially for incinerator 38 with this burner schematically shown as burner 130t having a multiplicity of small fuel jets therefrom in FIG. 14 so that this burner 130t incorporates all of the design considerations already mentioned by providing a multiplicity of small raw fuel jets distributed over the full flow area of duct 136t to provide efficient mixing of gaseous stream 130m, and any combustibles carried thereby, with the multiplicity of flames 140r from these fuel jets. Rapid mixing is obtained by the same principle portrayed in the rapid dispersion of the ink in duct 136c in FIG. 11 in minimum duct length $L/10$. Also, it will be apparent hereinafter that each flame 140t in burner 130t in FIG. 14 is completely stable over a wide range of velocities of gaseous stream 130m, fuel flows and oxygen percentages; and that a convenient and easy adjustment is provided to permit setting stream flow pressure drop across burner 130*t* within desired limits to help obtain necessary turbulence and mixing at a minimum cost in pressure drop (at minimum fan horsepower).

It will be apparent hereinafter, as the discussion proceeds, that burner 30 provides all of these desirable characteristics for all incinerators 38*a*, 38*b* and 38*c*, and gives many of these desirable characteristics to any type of gas or air heater 40 in which it is used.

(f) Wake formation generated by flat plate in flowing stream

Now lets explore the sample construction used in burner 30 to obtain at inexpensive cost all of these aforementioned desirable modes of operation and advantages.

The theory of operation is best understood by a brief explanation of fluid mechanics, and especially of wake formation behind a normal flat plate or any other similar object forming a wake, such as a plate inclined at a fairly large angle or a bluff-shaped body. The present discussion will be about plate 111 in FIG. 16 extending along the direction perpendicular to the plane of the drawing, and normal to the direction of flow of stream 32 therepast so as to form a wake there behind as a downstream wake. This wake is similar to that observed behind a square-backed row boat as it travels forwardly through the water.

Flowing stream 32 causes two surfaces of discontinuity 114 to start at each sharp edge 111*a* of plate 111 composed of plate-like portions, and to extend downstream behind it. These surfaces 114 are stable in form and enclose zone 145 to be described in more detail hereinafter. Even at low values of Reynolds' Number, separation takes place at plate edges 111*a* (also called flow edge or flow opening portions herein) and a strong eddying wake is formed downstream thereof. Edge 111*a*, trying to hold back the continuous portion of flowing stream 32, creates a velocity gradient, as shown by arrows 114*a*, in the direction normal to the flow of stream 32. Then, the forces due to viscosity in the fluid, and the shearing stress between adjacent layers of fluid, create surface of discontinuity 114 to create differences in pressures along the stream flow in the surface of discontinuity finally rolling up into eddies adjusting themselves in strength and position so as to form a stable arrangement by providing a double row of eddies (including two eddies 117, one in each row, moving generally in the direction of their arrows in FIG. 16), known as a vortex trail, where the two surfaces of discontinuity 114 are formed and the actual wake created. Hence, the surface of discontinuity 114 cause gaseous stream eddies 117 to be diverted toward zone 145. Zone 145 on the downstream low pressure surface, surface portions, or side 111*b* of plate 111 is generally stable in form, and is sometimes called the "dead-water" region. Hence, surfaces of discontinuity 114 are generally stable in form and enclose a mass of fluid in zone 145 substantially at rest and at the same low pressure throughout as stream 32 far upstream form plate 111. This high velocity flow over plate edges 111*a* creates this low pressure in zone 145 behind plate 111 so as to suck from each eddy 117 some fluid portion 145*e* in zone 145 laterally into the main portion of stream 32 flowing over each edge 111*a* for entrainment of portion 145*e* in stream 32 thereat. This is true under Bernoulli's Theorem wherein low pressure exists adjacent to a high velocity stream (similar to the aspirator action at a venturi) since the total energy of a stream is the sum of its kinetic potential and pressure energies.

These eddies 117 in diverted stream portions 32*a* of stream 32, diverted from main stream portions 32*b* which are permitted to flow past plate 111, divert into different parts 145*b*, 145*c*, 145*d* of zone 145 shown in dotted lines in FIG. 16 for clarity of illustration. If combustion is taking place within zone 145, eddies 117 can feed oxygen from diverted stream portions 32*a* to the combustion in different parts 145*b*, 145*c* and 145*d* of zone 145, but these eddies encounter resistance to intrusion into zone 145 because of the outward expansion and pressure of the hot combustion products generated therein.

These eddies 117 cause a mixing action tending to mix any fluid in zone 145, and especially if the fluid is rapidly expanding hot combustion products in combustion zone in zone 145, with the remaining portions of stream 32 in surfaces of discontinuity 114 by eddies 117 and by turbulence 119*a* and 119*b* laterally of and downstream from zone 145. Factors in this mixing and low pressure entrainment action are: (1) the greater the distance between edges 111*a* across plate 111, the greater the distance downstream from plate 111 is required to get good mixing, (2) the relative velocity of gaseous stream 32 and of the fuel discharged from burner ports 56*a*, (3) the higher the velocity of stream 32 over edges 111*a* in stream portion 114, the faster the mixing, the lower the pressure in zone 145, and the greater the entrainment of zone portions 145*e* in flowing stream 32.

Frequent references will be made hereafter to the description in this section of the specification on the wake formation generated by flat plate 111. Since each of the burner forms in FIGS. 4–10 and 17–21 of the drawing are believed to follow this principle of operation, FIG. 16 will be the reference hereafter to the general mode of operation of each of these burners and reference each time will be made to FIG. 16, by analogy, so that the details of FIG. 16 need not be repeated in each of these other drawing figures. Since basically the same action occurs downstream of plate 111 in flowing stream 32 (whether or not combustion is occurring there), it will be apparent herein that these corresponding portions exist and the specification hereafter may refer zone 145 as combustion zone 145; portions 145*a* and zone parts 145*b*, 145*c* and 145*d* as combustion zone portions 145*a* and combination zone parts 145*b*, 145*c* and 145*d* of combustion zone 145 with combustion zone parts 145*b*, 145*c* and 145*d* being respectively low, medium and high fires in combustion zone 145. Plate 111 having edges 111*a* in FIG. 16 will take the form of the flame holder, plate-like portions, upstream combustion zone surface, surface portions, etc. having flow edge portions or flow opening portions thereon shown as plates 94 and 96 in FIGS. 3–10, walls 157 and 159 in FIG. 17, plate 155 in FIG. 18, screen 161 in FIG. 19, perforated plates 163 and 165 in FIGS. 20 and 21, etc. Eddies 117 and turbulence 119*a* and 119*b* in FIG. 16 will not be repeated in FIGS. 4–10 and 17–21 for convenience of illustration since reference can be made to them in FIG. 16. Combustion zone 145 extends over the whole downstream surface of grid 90 and has many separate portions 145*a* over grid 90.

(g) Combustion, mixing and incinerating actions

Now, there will be described the specific combustion, mixing and incinerating actions of burner 30 in FIGS. 1, and 3–10.

The combustion action will next be described. Combustion zone 145 is formed on downstream (top) surfaces 96*d* of top plates in FIGS. 3–10 with different combustion zone portions 145*a* above each solid portion of this surface 96*d* with each portion having upstream combustion zone part 145*b*, intermediate combustion zone part 145*c* and downstream combustion zone part 145*d* within which burns respectively low, intermediate, or high flame.

Although partial plates 94' and 96' in FIG. 4 have basically the same mode of operation, the discussion will be restricted to full size plates 94 and 96 for simplicity of explanation. The flow action of stream 32 in downstream direction 34 coacting with these plates 95 and 96 causes a diverting action in response to the flow of the stream for dividing stream 32 into main stream portion 32b (the main portion of stream 32 and flowing through the openings of over the edge portions within, between or on the side of the plates) and diverted stream portions 32a (making up a small percentage of total stream 32). This diverting action is caused by the surfaces of discontinuity 114 in FIG. 16 downstream from edges 111a causing gaseous stream eddies 117 to be diverted toward combustion zone 145 into or toward the various parts 145b, 145c, and 145d of the combustion zone in the quantities required for flame combustion in these respective combustion zone parts for respectively low, medium, or high flame. Surfaces of discontinuity 114 in FIG. 16 are formed by the high velocity stream flow gradients over edge portions 111a. This diversion automatically supplies the quantity of oxygen required in diverted gaseous stream portions 32a capable of supporting combustion to various combustion zone parts 145b, 145c, and 145d for any selected low, intermediate or high flame with the flame extending into more combustion zone parts as it increases in size. The flame, regardless of its size, is compleiely stable over a wide range of air velocities, gas flows and oxygen percentages with more oxygen or air being supplied as the flame increases in height and requires more oxygen for combustion. The actual combustion zone 145 varies in size with the fuel supply rate. Combustion occurs only when the proper mixture of oxygen and fuel is achieved. This oxygen supply increases progressively with higher flame extending a greater distance downstream from plate surface 96d. The quantity and velocity of these eddies 117 in FIG. 16 created by surfaces of discontinuity 114 provide the desired oxygen feeding action to the flame. This action permits burner 30 to have a high "turndown" range without need for expensive zoning controls or special air mixing equipment. Critical aspect in achieving a high turndown range in the low fire (small flames in part 145b) performance, and it has in the past been difficult to achieve the desired flame stability at low fire in the presence of strong gaseous stream currents in the duct in which the burner is located. Burner 30 provides careful and automatic control of feeding of combustion air or oxygen at the low fire area close to the downstream side of plate surface 96d and in combustion zone part 145b. High fire, of present burner 30, has lots of room in full combustion zone 145 (including parts 145b, 145c, and 145d in each portion 145a) for the flame to develop and burn freely.

Plate surface 96d, carried by fuel pipe 56, faces generally in downstream direction 34 and forms therein combustion zone surface means and an upstream portion of combustion zone 145 having the combustion flame therein. Hence, plates 96 effectively separate combustion zone 145 from the downstream flow of gaseous stream 32. This surface 96d prevents quenching the flame by shielding combustion zone 145 from a high-velocity blast of flowing gaseous stream 32; assures that low enough stream velocity occurs in each combustion zone part 145b, 145c, and 145d sufficiently low for fuel ignition, flame propagation and combustion to take place therein for the corresponding height flame; serves as an effective flame holder; and helps the mixing action needed for incineration and for assuring uniform temperature in duct 36 downstream from burner 30. Quiet zone 145 in FIG. 16 on downstream surface 111b of plate 111 is not only relatively quiet but has low pressure to provide an ideal location for flame combustion eddies 117 that not only feed the oxygen to the fuel for combustion but also break up the flowing fuel jets, such as natural gas jets by the turbulence of the eddies. This low velocity, low pressure zone 145 is ideal for fuel ignition, flame propagation and combustion. The stability of the flame is assured and the oxygen-to-fuel mixing ratios are balanced to provide maximum efficiencies over the entire operating range of burner 30 from low to high fire. Any sudden changes in the velocity of stream 32 will not adversely affect the flame in combustion zone 145 protected by surface 96d so "flame-out" will not occur.

Fuel, such as natural gas, is discharged through fuel ports 56a into diverted portion 32a of gaseous stream 32 in combustion zone 145 closely contiguous to plate flame holding and combustion zone surface 96d, and approximately equally spaced from the edge portions of surface 96d as substantially raw fuel with no outside air supply other than diverted portion 32a of stream 32. Although burner ports 56a are shown as oriented to direct the fuel discharged therefrom in a downstream direction into combustion zone 145, it should be readily apparent that many aspects of this invention will be obtained if these ports were located downstream or laterally of surface 96d so as to direct their fuel either upstream of transverse to the stream into combustion zone 145 contiguous to surface 96d.

Each plate surface 96d is made up of substantially flat plate-like surface portions extending across duct 36 as downstream surfaces of the plate 96 with the plate-like portions serving as a well means with this surface 96d forming a flame holding surface to which the flame hugs and clings to, and spreads over, the whole downstream side thereof, as shown in FIGS. 9 and 10, for numerous reasons. First, flow of stream 32 in FIG. 16 over plate edges 111a creates a wake downstream of plate 111 generating, by the high velocity flow over plate edges 111a, low pressure in zone portions 145e. This same fluid flow phenomena in FIG. 16 causes the flame to stay in combustion zone 145 by clinging to all portions of downstream combustion zone plate surface 96d, in response to flow of stream 32, during all flow velocities of stream 32 and all fuel flow rates out fuel ports 56a. Second, eddies 117 tend to confine the flame within combustion zone 145 and push it toward flame holding plate surface 96d. Third, swirling eddies 117 cause the flame in combustion zone 145 to burn back on itself so as to stabilize the flame and keep it confined within combustion zone 145.

Surface 96d is effective as a flame holder under a wide variety of operating conditions. It acts as an effective flame holder for all fuel and gaseous stream velocities, and flame heights.

Note the simplicity of this construction wherein either substantially raw-fuel or raw-fuel (such as raw gas in unaerated condition) uses a flat plate as a flame holder or stabilizer; no complex structure is required for this effective flame holding action.

A blanket of flame is formed over the downstream surface of grid 90 covering all top plate flame holding surfaces 96d substantially completely. As gaseous stream 32 in FIG. 16 flows at high speed over plate edges 111a, it creates (by Bernoulli's Theorem) low pressure in zone portions 145a thereat to pull the flame on the downstream portion of plate holding surface 96d out to the edges 111a so as to spread the flame over the whole surface 96d acting as a flame holder at all flame heights and to assure along edges 111a the maximum flame face length exposed to flowing gaseous stream 32 for providing maximum mixing of combustion products from the flame in combustion zone 145 with flowing gaseous stream 32. It is not necessary to control delicately and accurately guide an air film between the flame and any metal surface to provide a flame holder effective for all flame heights. This flame spreading action provides a flame blanket extending across the downstream face of grid 90 and across duct 36, and believed by some to spread across the full flow area of the duct and through which flame blanket gaseous stream 32 passes for incinerating the combustibles in stream 32. Hence, the flame is held within combustion zone 145 but covers full plate surface 96d with the mixing of the hot combustion products with the gas stream taking place at the periphery of combustion zone 145. Grid 90 is composed of plate-like portions extending across duct 36 and having openings therethrough for flow of gaseous stream 32 therethrough intimately contiguous to the flame in combustion zone 145 extending over the full downstream face of grid 90.

Mixing means, responsive to flow of stream 32 and combustion products from combustion zone 145, is provided for mixing after combustion these hot combustion products with all portions of stream 32 to get a thorough and uniform mixture. This is done by diverting small portions 32a of stream 32 into combustion zone 145, burning the substantially raw fuel with these diverted portions 32a to create products of combustion having a theoretical maximum temperature of about 3600° F., and then subsequently mixing these hot products of combustion with all portions of stream 32.

Mixing is caused by differences in relative velocities of adjacent portions of flowing stream 32, such as velocity gradient 114a in the direction normal to the motion of the fluid in the earlier described surfaces of discontinuity 114, for forming vortexes and creating turbulence, such as turbulence 119 or 119b in FIG. 16, for efficient and effective mixing; and by the flow of stream 32, expansion of the hot combustion products in combustion zone 145, and movement of eddies 117.

Although this mixing action is a complex phenomenon taking place in many different manners at the same time, it will be separated for the purpose of this discussion into two different methods: (1) mixing the hot combustion products with stream 32 adjacent each combustion zone portion 145a separated by main stream portion of stream 32, here called a combustion zone mixed portion, and (2) subsequently mixing each of these individual combustion zone mixed portions (spaced across the downstream face of grid 90) together and with all portions of stream 32 to make a substantially homogeneous mixture in stream 32 to uniform temperature.

In the first method, each combustion zone mixed portion is formed from the hot combustion products in its associated combustion zone portion 145a. In FIG. 16, high velocity streams 114 flowing over plate edge portions 111a generate low pressure at the downstream side of plate edges 111a to suck (by the swirl of each eddy 117) combustion products sucked-in portions 145e in FIG. 16 contiguous to edge portions 111a into gaseous stream 32 flowing therepast for providing mixing of these combustion products with portions of gaseous stream 32.

Also, high velocity streams and surfaces of discontinuity 114, the expansion of the hot combustion products and the turbulence in combustion zone 145, and flow of stream 32 cause in FIG. 16 turbulence 119a beside combustion zone 145 and turbulence 119b downstream therefrom to mix combustion products from this combustion zone portion 145a with portions of stream 32.

In the second method, these mixtures from the different combustion zone mixed portions (spread across the downstream surface of grid 90) can be mixed together and with the remainder of stream 32. This phenomena is based on lateral diffusion of the hot combustion products following the principles disclosed in explaining duct 136c in FIG. 11 and in explaining burner 130t in FIG. 14. Providing many flames 140t in FIG. 14 close together gives rapid lateral dispersion of the products of combustion therefrom, as shown by the lateral dispersion of the ink in duct 136c in FIG. 11 dispersing in one-tenth the distance (L/10) than the distance (L) if only one ink source is provided in duct 136a. Having plate edge portions 111a in FIG. 16 close together on adjacent plates 111 as they straddle stream 32 flowing therebetween provides many flames in combustion zone portions similarly spaced across duct 36 for causing rapid lateral dispersion and mixing of the combustion products from each combustion zone portion 145a.

In both of the last mentioned first and second methods, the long length flame face in each combustion zone portion 145a exposed to flowing gaseous stream 32 is also important in each mixing method mentioned in the preceding two paragraphs. Thus, plate edges 111a in FIG. 16 are provided for forming the maximum flame face length (measured as the peripheral length about each stream flow opening or flow edge portion in grid 90 in FIG. 3 or 22 or the bottom right hand portion of FIG. 4) exposed to flowing gaseous stream 32 for providing maximum mixing of the combustion products from the flame in each combustion zone portion 145a with its associated gaseous stream portions since these edge portions are constructed and arranged to form many stream flow paths across duct 36 for gaseous stream 32 flowing past the edges of the flame portions so as to provide maximum mixing in minimum distance along the flow of gaseous stream 32 downstream from burner 30. Good incineration requires good mixing of the combustion products into the gaseous stream flowing past, and the true factor in mixing is the length of the flame face where the flowing gaseous stream picks up the products of combustion. Having the flame extend across full grid 90 in FIG. 22 and having lots of gaseous stream openings therethrough causes burner 30 to release its heat uniformly across duct 36. In contrast, a line burner, even if arranged in a complex form, such as a serpentine form, cannot place the flames this close together to provide this long flame face length.

Also, it is sometimes desirable to have the mixing occur independently of edge like 111a bounding the periphery of flame holder plate 111, such as laterally some distance from the combustion zone or flame, or upstream or downstream therefrom, as will be brought out in more detail hereinafter, especially when describing drawing FIGS. 19, 20, and 21.

Some flow distance and time is involved downstream from burner 30 before incineration of the combustiles in stream 32 is complete, but this distance or time is minimized in each incinerator 38 illustrated in the present application. First, there is a mixing time wherein the combustibles and oxygen in stream 32 must be thoroughly mixed by turbulence with the hot combustion products. Second, there is the combustion or chemical oxidation time for the molecular combustibles that incinerate quickly. This incineration of course contributes to the heat release necessary to raise to, and to maintain, the incineration temperature. However, this relatively small amount of heat is generally ignored in calculations and really amounts to a safety factor in design. Third, sufficient residence time is required to burn through solid or particulate combustible particles so as to progressively oxidizes them from the outside in and to reduce them to gaseous form. Burner 30 reduces these first two times to a minimum, but the third time is required to be allowed for in designing the length of downstream duct 36.

It should now be apparent that surface 111b and its bounding edges 111a therefore may provide in common for any burner 30 all of the functions of flame holding, diverting small diverted portion 32a of stream 32 for combustion into combustion zone 145, and/or aiding in subsequently mixing the hot combustion products with all portions of stream 32.

(h) Modification of burner 30 and Factors effecting burner performance

Various modifications of plates 94 and 96 and fuel pipes 56 in FIGS. 4–10 suggest themselves; and some of these modifications are shown in FIGS. 17–21 of the drawing as modified burner forms. Each is substitutable in burner 30 in FIGS. 4–10 in place of plates 94 and 96 and associated fuel pipe 56 to form a burner operating in basically the same way as burner 30 earlier described and providing a grid-type burner having grid 90 extending across duct 36.

FIG. 17 shows a composite of two different types of burners, including rectangular fuel pipe 156 on the left and triangular fuel pipe 158 on the right having respectively downstream plate or wall 157 or 159 having fuel holes 157e or 159e therethrough and downstream surface 157*d* or 159*d* each bounded by two opposite edges 157*w* or 159*w*.

Plate 155 in FIG. 18, shown as really a composite of two different types of burner plates fed by common fuel hole 155*e*, has in the right hand portion a flat plate with downstream surface 155*d* and edge 155*w* and in the left hand portion downstream surface 155*d'* with turned up edge 155*w'*.

Screen 161 in FIG. 19 has downstream surface portions 161*d*, fuel hole 161*e* in the mesh thereof, openings 161*p* between the mesh of the screen on which downstream surface portions 161*d* are located and edge portions 161*w* as the surrounding outer edge of screen 161. Downstream surface portion 161*d* of each wire adjacent fuel opening 161*e*, serves as a flame holder to which the flame clings downstream therefrom since the mesh of the screen slows down flowing stream 32 adjacent openings 161 therein to provide low pressure combustion zone 145 and portions 145*a*; eddies 117; and turbulence 119*a*, 119*b* shown in FIG. 16.

The flame does not cover the whole downstream surface of screen 161 but only adjacent fuel hole 161*e*. The thicker the wire in the screen, the closer we get to a perforated plate. Some variations of perforated plates are shown in FIGS. 20 and 21. The thicker the wire, the more each wire acts like an individual flame holder with the flame following along other wires back to fuel hole 161*e* so as to form a flame grid design, similar to flame grid 90, serving as a flame holder. FIG. 19, for simplicity of illustration, shows the flame in combustion zone 145 only on the screen wires in the plane perpendicular to the plane of the drawing, and not on the screen wires in the plane of, or parallel to the plane of, the drawing on which the flame must exist to connect the shown flame with burner port 56*a*.

FIGS. 20 and 21 respectively show perforated plates 163 and 165 having respectively downstream surface 163*d* or 165*d*, fuel hole 163*e* or 165*e*, openings 163*p* or 165*p* increasing in diameter as they progress away from their associated fuel hole to either gradually or sharply increase the percent open in the plate, and outer plate edge portions 163*w* or 165*w*.

Burner 30, as illustrated in the drawing, may have to be modified substantially in design for different temperature rises since different portion 32*a* of gaseous stream 32 is diverted to the flame and different mixing characteristics may be desired. FIGS. 4–10 and 17–21 are intended to show some typical forms of construction with the factors effecting the design and mode of operation desired, described in more detail immediately heretofore and hereafter, where required for burner 30 with different operating conditions when used in the earlier described uses of make-up air or space heater, oven, dryer, evaporator, draw furnace, and combustile incinerator. Other factors have been mentioned throughout this description, and especially during the discussion of FIG. 16, enter into proper burner design and are not repeated here.

Many design or construction factors are involved.

It should be readily apparent that a much smaller portion of gaseous stream needs to be diverted for a make-up air heater having a 3° F. temperature rise and thorough mixing is not as important in contrast with the much larger portion of diverted gaseous stream and the much greater importance of thorough mixing with as much as 1500° F. rise for incinerator 38.

The choice of the particular burner construction is determined by the gross velocity of stream 32 through duct 36, the net velocity of stream 32 through the different flow openings or over the different flow edges in duct 36 and burner 30, quantity and velocity of the fuel issuing through the fuel ports, the temperature rise desired for gaseous stream 32 as it goes through burner 30, the widths of the solid surface portions and the distance between the flow openings in burner 30, and temperature of the final hot mix (if stream 32 is raised from 0° F. to 80° F. as the final hot mix temperature, considerable different factors are involved than if the temperature is raised from 200° F. to 1400° F.). The choice of factors should be made to give correct amounts of oxygen to, combustion in zone 145 for the particular temperature rise desired. These factors, phrased in another way, include size of each flow opening and surface portion therebetween, the percent open area for flow in each portion of the duct, rate of percent open area changes from one portion of the duct to another across the duct, number of stream flow openings between flames (one opening will cause faster mixing action than three small openings), and the center line distance between fuel holes (this will determine the rate of lateral mixing of the combustion products by the ink in the liquid example in duct 136*c* in (FIG. 11). Putting these factors still another way is to state that the factors involve the shape, orientation, size, space between, relative location with respect to each other, etc. of burner fuel ports, duct 36, each surface portion and edge portion, etc.

The quantity 32*a* of stream 32 diverted into combustion zone 145 varies considerably with the type burner from about ¼ of stream 32 for a high temperature rise, such as a 1400° F. rise for an incinerator, to $\frac{1}{1300}$ part of stream 32 for a low temperature rise of about 4° F. for a make-up air heater.

Also, the fluid flow pressure drop may vary from 0.15 inch to 2 inch water column; this is a substantial variation permitting large flexibility in design.

By proper design, any degree of mixing and turbulence desired may be obtained.

Little turbulence is desirable for a small flame when you want to divert only a small quantity 32*a* of air from stream 32 into the combustion zone for combustion of the small quantity of fuel fed thereto. More than one flow opening (preferably many flow openings) must be in the plate-like portion between adjacent burner ports if little turbulence around, and stability of, a low flame in combustion parts 145*b* is desired, such as in a make-up air heater.

Any high temperature rise burner, such as an incinerator, can use high turbulence since it has a large flame and there is little chance of quenching the flame. Then, wide, solid plates can be used with one large opening therebetween spaced on wide centers, as shown in plates 96 spaced between fuel ports 54*a* in FIG. 4, to get the desired fast mix action for incinerators.

It should now be apparent that any of the surface and edge portions associated together can perform any one of the stream diverting, flame holding, mixing, or combustion zone shielding functions described herein with some of these functions performed by some portions and other functions provided by other portions, such as a separation of the flame holding function and the major mixing function.

This last concept becomes especially apparent when the variation in percent of open area in perforated plates 163 and 165 in FIGS. 20 and 21 is understood. A small percent of open area can be used near the flame so that there will not be enough stream diverted at sufficient velocity to quench the flame. A larger percent of open area can be provided by either larger diameter holes, or by placing the holes closer together. For example, portions of stream 32 through 10% open area has less velocity and tend less to quench the flame than through 40% open area used for larger flame and greater turbulence where desired. A single large, unperforated plate extending across the duct with the same total percent of open area of the duct, may quench a small flame with its excess turbulence. A gradual increase in the percentage of open area along the plate progressively away from the fuel port, as shown in plate 163 in FIG. 20, will permit a low flame over fuel port 56*a* with no tendency for diverted stream portions 32*a* to quench it while still permitting large turbulence in the outer and larger percent of open area located farther from fuel port 56a. The more rapidly the percent of open area changes from one portion of the plate to the other, as shown in plate 165 in FIG. 21, the greater will be the turbulence and mixing action. A large percent of open area near the wall of duct 36 and a smaller percent of open area near the flame in combustion zone 145 will permit a large flow of stream 32 through a given size duct 36, and a quiet zone around the flame, but sufficient turbulence far downstream of the plate to provide the desired mixing action between all portions of stream 132 and the products of combustion. Plate 163 in FIG. 20 has the percent of open area of its openings gradually increasing as the distance from level hole 163e increases across duct 36 for providing less gaseous stream diversion by the diverting means for supporting combustion of a lower flame in combustion zone 145 over fuel hole or port 163e, for causing more rapid mixing by the mixing means downstream from the larger percent of open area out near the edge of the plate, and for permitting a larger portion of the gaseous stream to flow through the larger percent of open area at the outer edge of the plate. In contrast, the percent of open area in plate 165 in FIG. 21 formed by the openings therein is substantially greater in an outer flow path therethrough than in the contiguous path closer to combustion zone 145 for causing much greater turbulent mixing action downstream from these openings by the different relative velocities downstream thereof in these flow paths. Hence, it is possible to get any desired type of gaseous stream distribution and mixing pattern desired by merely changing flow, opening size, location, etc.

It should be noted that this separation of mixing and flame holding functions into the desirable combination and association need not be restricted to a perforated plate but might be provided by combining FIGS. 18 and 19 and eliminating the fuel tube 56 in FIG. 18 so that screen 161 provides the flame holding function while plate 155 provides the mixing function in flow duct 36. Screen 161 acts like a perforated plate providing less turbulence in the combustion zone area so that a lower flame can burn there where only a small temperature rise is desired to be applied to stream 32.

Although the plate-like portions are shown as coplanar in FIGS. 4–10 and 17–21, different plate-like portions may be parallel to each other and non-coplanar in any grid 90 extending across duct 36, as will be mentioned again in the next section of this specification, to vary these combustion, flame holding and mixing functions.

Sharp edges (such as edges 111a in FIG. 16, edges on flow slot 94p in FIG. 4, and many other instances in the drawing) provide more lateral stream diversion and stronger eddies 117 in FIG. 16 while bent up edge 155w' in FIG. 18 tends to cause less lateral diversion of stream portions 32a toward combustion zone 145.

Two specialized applications of burner 30 will further illustrate these variations in design, as set forth in the following two paragraphs.

A grain or milk dryer generally has these respective granular or liquid products spread across duct 36 located downstream from burner 30, or suitable modification thereof. Since burner 30 has substantial uniformity of temperature and substantial turbulence downstream thereof, such burner will uniformly dry these liquid or granular products and will not tend to burn some portion thereof because of "hot-spots" in the flow stream.

Make-up air heaters are generally used to solve heating problems created by excessive ventilation. If air within a building must be continually replaced for comfort or health reasons, the additional heating load may be too much for the existing heating system. These conditions are sometimes found in forges, metal smelting or refining shops, chemical plants, large restaurants, paint spray shops, welding shops, foundries, etc. There, a make-up air heater is used to raise the incoming air to room temperature and thus handle the extra heating load without overtaxing the existing heating system.

A make-up air heater discharges its combustion products directly into the air stream so no undesirable contaminants are permissible, but any traces thereof are diluted to such an extent that they are generally undetectable. The most critical feature in a make-up air heater is that it have a long turn down range since the make-up air may need to be raised only a few degrees when mild outdoor temperatures exist but may need to be raised as much as 100 degrees in cases of severe outside winter conditions. The preferred turn down range is about twenty to one. It should be readily apparent that burner 30 may be used in air heater 40 as a make-up air heater. The basic difference in mode of operation is that the temperature rise is higher in incinerator 38 than in a make-up air heater 40. A perforated plate-like member, similar to perforated plate 163 in FIG. 20 or screen 161 in FIG. 19, is ideal for use in a make-up air heater burner since it is constructed and arranged to supply automatically the quantities required of diverted gaseous stream portions 32a capable of supporting combustion to various parts 145b, 145c and 145d of combustion zone 145 for any selected low, intermediate or high fire (with the flame extending into more combustion zone parts as it increases in size) to provide a long turn down range while being arranged to shield the combustion zone from any blast of flowing gaseous stream 32 adequate to quench the flame in combustion zone 145.

The structure in each form of the present invention in FIGS. 4–10 and 17–21 may be briefly described as a plate-like portion carried by a fuel pipe and serving as a flame stabilizer for substantially raw fuel supplied by the pipe in a direct-fired gaseous stream heater with some flow opening portions in the plate-like portion of at least one opening forming a flow path for said gaseous stream through the duct and flame in intimate contact with the flame, and to stabilize the flame, by having any such flow opening portion separate the portion of the gaseous stream 32a for combustion from the main gaseous stream portion 32b with the combustion products mixed subsequently with all gaseous stream 32 portions with the degree of turbulence desired in minimum duct length.

It has been found that a good operative burner 30 for non-catalytic and non-recuperative incinerator 38b operating at 1400° F. incineration temperature in FIG. 1 will be obtained by using the following approximate dimensions and operating characteristics:

Fuel port diameter—0.081"
Fuel port spacing—¾"
Pipe 56 spacing—4"
Fuel quantity discharged—8,880 cubic feet per hour of natural gas
Temperature rise of stream 32—1200° F.
Stream 32 flow—5420 standard cubic feet per minute
Flow pressure drop across burner 30—0.3" water column

| Grid plates 94 and 96 | Inches | |
|---|---|---|
| | Length | Width |
| Bottom plate 94 | 11¾ | 5⅝ |
| Slot 94p | 3¼ | 1¼ |
| Notch 94q | 1½ | ⅝ |
| Notch 94r | 3¼ | ⅝ |
| Notch 94s | 1½ | 1¼ |
| Top plate 96 | 11¾ | 4¾ |
| Slot 96p | 3¼ | 1¼ |
| Notch 96s | 1½ | 1¼ |
| Duct 36 flow opening | 36 | 24 |

(i) *Some terminology*

It will be noted that there is much generic and subgeneric structure in the different grid modification structures in FIGS. 4–10 and 17–21 with terms for this structure, etc. being defined herein.

"Plate-like portion", as used herein, includes any part or the whole of plate 94, 94', 96 or 96' in FIG. 4, whether coplanar or parallel plates or plate-like portions; downstream wall 157 of rectangular fuel pipe 156 in the left hand portion of FIG. 17; downstream wall 159 of triangular fuel pipe 158 in the right hand portion of FIG. 17; left and/or right hand portions of solid plate 155 in FIG. 18; screen 161 in FIG. 19; perforated plate 163 in FIG. 20; and perforated plate 165 in FIG. 21; etc. In any burner, at least some of these plate-like portions have a flow opening portion or flow edge portion forming at least a portion of at least one flow opening forming a flow path for gaseous stream 32 in duct 36 with: (1) with this "flow opening," "opening," "flow edge" or "edge" (and the component "flow opening portion," "opening portion," "flow edge portion" or "edge portion" thereof), as used herein, includes stream flow slots 94p and 96p in FIG. 4; hole or opening 161p in screen 161 in FIG. 19; and holes, openings on perforations 163p in perforated plate 163' in FIG. 20 or plate 165 in FIG. 21. "Flow opening portion", "flow edge portion", "edge" or "opening", as used herein, form at least part of a flow opening and include in FIGS. 3–10 stream flow notch 94q, 94r, 94s, or 96s, stream flow straight edge 96v or 96w, stream flow notch 94r' or 94s', or stream flow straight edge 96w' forming in superimposed, coplanar and/or transversely opposed sets of two or four substantially the entire outline of one flow opening for each set; and the last mentioned flow notch or straight edge in FIGS. 3–10, edge 157w and/or159w in FIG. 17, edge 155w and/or 155w' in FIG. 18, edge 161w in FIG. 19, edge 163w in FIG. 20 and/or edge 165w in FIG. 21 coacting or forming with another one of these edges or slots another plate-like portion, or with the interior wall of duct 36, a substantial portion of another so-called "flow opening." Each "plate-like portion" is carried by fuel pipe 56 in FIG. 4 or 18–21; or by fuel pipe 156 or 158 in FIG. 17 and have the combustion surface thereon located betwen portions of the so-called "openings" or "edges" for forming a flow path for gaseous stream 32 through duct 36 intimately contiguous to the flame in combustion zone 145. "Surface portion," as used herein, includes any downstream component portion of any plate-like portion located between said opening portion; and "edge portion," as used herein, includes any portion of any bounding edges of any surface portion on any plate-like portion, whether around a hole or other opening in said plate-like portion," as on the peripheral edge thereof.

Each "plate-like portion," as used herein, includes any component portion of: solid plate 155 in FIG. 18 having burner port 155e in the center thereof and any edge portion of this plate, including any edge portion 155w or 155w', located on the periphery of plate 155 so that the edge portions form the entire distal edge of the surface portions and flame holder and over which at least some portions of stream 32 are diverted; screen 161 in FIG. 19 having holes 161p therein bounding these surface portions located on the downstream surface of the component wires thereof and having edge portions around the holes therein; separate coplanar and/or superimposed plates 94, 94', 96, and 96' in FIG. 4; downstream wall 157 and/or 159 of fuel pipe and/or 158 in FIG. 17; or perforated plate 163 in FIG. 20 or 165 in FIG. 21. These respective plate-like portions form a grid extending across duct 36, are located on the downstream side of fuel supply pipe 56, 156 and/or 158 and have openings or apertures (gas flow slots or holes 94e, 94f, 94g, 96e, 94e', or 94g' in FIG. 4; and/or fuel hole 155e, 157e, 159e, 161e, 163e and/or 165e) therein coinciding with the fuel ports to permit fuel from said fuel supply pipes to flow into combustion zone 145.

Each plate-like portion (with its component surface portions as the downstream surface thereof and component edge portions) extends transversely of, or across, at least part of duct 36 and is sufficiently planar and extends sufficiently across this duct in flowing gaseous stream 32 for forming the downstream wake earlier described for combustion zone 145. This planar sufficiency includes the downstream surface portions if somewhat convex, somewhat concave, or having turned up edge portion 155w' in FIG. 18, etc. as well as flat or planar, so long as the desired wake is obtained. It should also be apparent that two or more plate-like portions (extending across, or transversely of, duct 36) need not be generally coplanar or made of the same type plate-like portions; but instead may be parallel plate-like portions (spaced some distance apart along the direction of downstream flow 34, such as when it is desired that the upstream portions provide combustion zone 145 while the downstream portions provide the subsequent mixing action spaced downstream from the combustion zone) or may be made up of different plate-like portions forming different components in any coplanar or parallel construction, such as when burner 30 might in an extreme case be partially formed of solid plate 155, perforated plates 163 and 165, rectangular fuel pipe 157 and triangular fuel pipe 159, screen 161, and plates 94 and 96 to get different combustion or mixing actions at each in different portions across duct 36.

Hence, it should be readily apparent that any one of the stream diverting means, flame holding means, mixing means, or combustion zone surface means may include some of these afore-defined surface portions and edge portions or opening portions; and that the comments heretofore about the mode of operation of surface portions of surface 96d, and its accompanying edge portions, generally apply generically to each of the forms shown in FIGS. 17–21, inclusive, and described heretofore. Also, since the component edge and surface portions are in a generally planar, plate-like portion in the drawings, these edge and surface portions do not extend appreciably downstream from the upstream end of combustion zone 145, extend generally across at least part of duct 36, are located upstream from their associated combustion zone portion 145a, and have surface portions bounded by stream flow edge portions (whether the periphery of a plate or the edge of a hole in the plate) over which portions of stream 32 flow.

(j) Shutters 160 in grid 90

It should be apparent from the descriptions of FIGS. 16–21 that grid 90 may be formed in FIGS. 3–10 of only top plates 96, but with bottom plates 94 omitted, to obtain the many advantages described heretofore for the different forms shown in the drawing, except the shutter action to be described hereinafter using superimposed or parallel plates 94 and 96 with or without partial plates 94' and 96'.

Shutters 160, each comprised of parallel plate 94 or 94' and plate 96 or 96' arranged as a pair of plates in two parallel layers. One advantage of using these flat plates is that they provide a very simple shutter and flame holder construction.

These parallel or superimposed layers of plates are carried by fuel supply pipes 56 and have in different layers stream flow opening portions (on the edges of stream flow slot 94p and 96p; of stream flow notches 94q, 94r, 94s, 94q', 94s', 96s, 96q', and 96r'; and of straight edges 96v, 96w, 96' and 96w') coacting to form portions of stream flow openings and flow paths through the layers of plates for the flow of portions of gaseous stream 32. When plate 96 or 96' is shifted in direction 107, the opening portions thereon are relatively shifted to change the shape of the stream flow path defined thereby. Hence, plates 94, 94', 96 and 96' are relatively movable shutter leaves for controlling flow of gaseous stream 32; having the downstream surface of top plate or shutter leaf 94 or 94' also acting as a flame holder in the same burner to provide a simple and compact and coacting burner sub-combination element; and effectively separating, or acting as a movable curtain or shutter between, combustion zone 145 and downstream flowing gaseous stream 32. As may be recalled, connecting means 98 are loose enough to permit relative sliding movement between the parallel or superimposed plates 94 and 96 that they connect to fuel pipe 56 but connecting means 99 must be loosened by loosening its nut 105 to permit this relative sliding movement between the plates in the different layers across duct 36 for changing the effective flow area of the flow openings formed thereby by movement in adjustment direction 107. When the new adjustment is reached, connecting means 99 may be tightened by tightening its nut 105 to lock its associated plates 94 and 96 together and to secure them firmly to their associated fuel pipe 56.

Each component shutter means includes at least some of the edge or opening portions of each of the aforesaid stream flow slots, notches or straight edges in two different plates, whether in the same or different layers, that coact together to form a flow opening and flow path so that relative parallel shifting of the plates cause these edge portions to change the shape of its associated stream flow path for changing at least some quantity of the function performed by the flow stream diverting, flame holding, mixing or combustion zone functions earlier described. Change of shape of a flow opening or flow path is meant any change in size or outline of that opening effecting the flow characteristics therethrough.

In the largest flow opening portion, plates 94 and 96 coincide in full grid component 92 and partial plates 94' and 96' coincide in partial grid component 92', as shown in the lower right and upper right of FIG. 4. Then, there are overlaid and axially aligned to form a full flow slot (or two aligned halves of a flow slot) stream flow slots 94p and 96p, two stream flow notches 94s and two stream flow notches 96s, two stream flow notches 94r and straight flow edges 96v and 96w, or four stream flow notches 96q with two stream flow edges 96w and two stream flow edges 96v. Two full flow slots are formed between adjacent full and partial grid components 92 and 92', or two half slots are formed between each grid component 92 or 92' and the inner wall of duct 36 or mounting plate 76, in a similar manner.

Since the aforedescribed flow slots, notches, and straight edges act to change the shape of the stream flow path or flow opening in basically the same manner when plate 96 or 96' is moved in direction 107, the remainder of this discussion on shutters will be restricted to the coaction between superimposed stream flow slots 94p and 96p in plates 94 and 96 aligned in the direction of stream flow when in their fully open shutter position.

A plurality of changes in operating functions numbered hereafter are possible by shifting only some or all plates 96 and/or 96' in direction 107 for adjustment of some or all shutters, including opening and closing either all or only some of the flow openings to change the flow path either in complete grid 90 or in only some selected portions of grid 90. First, adjustment of shutters can be used for making more uniform the gaseous stream flow across burner 30 and across duct 36. This can be done by decreasing the percent open area relative to the duct flow area to improve the overall stream flow uniformity. Adjusting all shutters simultaneously to decrease all flow path areas gives a more uniform flow in the same manner as one obtains a more even discharge outlet velocity when one uses small holes, instead of big ones, along the length of a pipe so that the unevenness of flow within the pipe is not so noticeable in the comparative discharge from the small holes. Second, adjustment of shutters can be used for changing the gaseous stream flow pressure drop across the burner by changing the shape of openings or flow paths therethrough. Third, if the actual flow volume through duct 36 and across burner 30 turns out to be lower than the theoretical designed volume, the heat release from burner 30 must be reduced. If this results in small flames and leaves many cold spots across burner 30 through which combustibles can pass without ignition, it is desirable to eliminate these cold spots by adjustment of some or all shutters across the face of burner 30. Fourth, adjustment of shutters permits changing the mixing rate by burner 30 of the combustion products and portions of gaseous stream 32 to help attain the necessary turbulence at a minimum cost in pressure drop (fan housepower). Hence, the intimate mixing of the combustibles and combustion products, or flame, is easily controlled for providing maximum combustible incineration capability. Fifth, although the mixing rate can thus be controlled in this manner by increasing the stream flow velocity or pressure drop, it should be realized that generally it is possible to get adequate and desired mixing even with a very low pressure drop by proper design of burner 30. Sixth, although each of these aforesaid shutter adjustments may involve adjustment of all shutters across the full width of duct 36, it should be readily apparent that any of these changes in function may be obtained in only one portion of burner 30, if so desired, by adjusting only the shutter in that portion. Since top plates 96 and 96' are laterally spaced apart and relatively movable in the same plane for lateral shifting, changing the shape of selected flow openings or paths in only one grid component 92 or 92' is possible by loosening only connecting means 99 and shifting only single plate 96 or 96' therein. Hence, it should be apparent that any of these aforementioned functions can thus be changed in only one grid component 92 or 92', if so desired. For example, this single plate 96 or 96' may be thus shifted for changing the gaseous stream flow rate through only its portion of burner 30 to make uniform any irregular stream flows or temperatures across duct 36. If a portion of the stream flow through burner 30 is too cold, it indicates that too much gaseous stream 32 is flowing therethrough so that it may be necessary to close the size of any flow openings thereat in order to decrease the stream flow therethrough so as to get this coldest spot in burner 30 up to the desired temperature, such as the 1400° F. incineration temperature. This type of operation is very important in getting good incineration because a cold spot in the incinerator will mean that the combustibles are not properly incinerated in that area.

It should be noted that all of the aforesaid shutter adjustments can be easily made in the field when the problems are encountered with such adjustments being easily made by merely using a screw driver in the screw driver slot in the head of bolt or screw 101 and a wrench on nut 105 in FIG. 5.

(k) Objects and advantages of burner 30

The fundamental object of burner 30, when used as an incinerator of combustible products in gaseous stream 32, is to have gaseous stream 32, and any combustibles carried thereby, (1) be heated as quickly as possible to the incineration temperature (2) to a uniform outlet temperature (3) thoroughly and intimately mixed with the hot products of combustion at a minimum distance downstream from burner 30 (4) with minimum flow pressure drop across burner 30 (5) while burning only substantially raw fuel; is to have burner 30 (6) have minimum initial or capital cost, (7) be operable at minimum operating cost, and (8) have wide flexibility of operation; and is to have the incinerator (9) meet the highest incineration standards for combustibles in the flowing gaseous stream. Each of these nine points will be discussed in more detail hereinafter, except the use of the substantially raw fuel, which has been discussed in detail heretofore. It should be apparent that the aforementioned nine objects are achieved by all burners 30 and are important not only for incinerator 38 but also in any heater, such as air heater 40 in FIG. 2, or burner.

First, stream 32, and its products of combustion, are heated as quickly as possible to the incineration temperature, whether this be 1400° F. for non-catalytic incinerator 38b in FIG. 1 or 800° F. for catalytic incinerator 38a in FIG. 23. The flame blankets the entire downstream face of burner 30 across the full cross section of duct 36 to force all combustibles into intimate contact with the fire.

In the opinion of many, since the combustibles pass through the flame, or become part of the flame, this contributes to completeness of combustion of the offending combustibles. All combustibles are exposed to, and are intimately mixed with, direct flame as they pass through burner 30 to make combustion of all combustibles complete. The flame appears to fill every grid opening through which the combustibles pass. Although many subscribe to this theory of desirable incineration, it is respectfully submitted that the maximum flame face length in this burner, and having each portion 115a in FIG. 16 of the flame at the edge of the stream flow opening or edge (as earlier described by the suction on the flame by the low pressure of the high velocity air stream under Bournelli's Theorem) having its hot combustion products sucked into stream 32 are important factors in good incineration. Burner 30 is really a grid or screen of flame completely filling duct 36. Many little air streams are provided through burner 30 and each stream flow opening is surrounded by flame. This desirable construction is not obtainable by a line burner, even though the line may be twisted into a serpentine or other complex form.

Second, stream 32, and its combustibles, reaches a uniform outlet temperature across duct 36 in a minimum distance downstream from burner 30. Burner 30 releases heat uniformly across duct 36 to assure ignition of all combustibles in stream 32, and to provide good temperature uniformity across duct 36. Then, combustibles are quickly ignited to add instantly additional temperature to give an immediate incineration action. Uniformity of temperature permits operation at the lowest possible temperature for incineration of the combustibles so as to keep the operating cost to a minimum. Burner 30 also operates with minimum differential temperature in gaseous stream 32 so as to give lower temperatures at "hot spots" in the incinerator to thus prolong the life of the equipment. It has been found that three feet downstream burner 30, the differences in temperatures across the duct is not measurable, and is certainly less than 5° F. Thorough and intimate mixing of the combustion products and gaseous stream 32 assures this uniform temperature in minimum duct length to assure rapid and complete incineration.

This desirable characteristic of heating stream 32 as quickly as possible to a uniform incinerating temperature across duct 36 in minimum duct length for incinerating the combustibles in minimum time and at minimum expense is primarily obtained by the long flame face length, and many fires close together (see duct 136c in FIG. 11 and see FIG. 14) giving maximum mixing action by quick lateral diffusion of the hot combustion products with all of stream 32, as earlier described. Since grid 90 completely fills duct 36, all combustibles are uniformly forced into the uniform burning characteristics of burner 30 where flammability and ignition temperature requirements are met and so that all combustibles are thus uniformly incinerated.

Fourth, flowing stream 32 causes minimum flow pressure drop across burner 30. Minimizing flow pressure drop generally means reducing the complexity and cost of original burner 30 and decreasing the cost of operation thereof by reducing the fan power required for operation. It has been found that with the construction illustrated in the drawing that the flow pressure drop can be as low as 0.15 inch water column, depending on the design of the burner, and will generally vary in the range of 0.15 to 2.0 inches water column. It should be apparent by consideration of FIG. 16 of the drawing that the structure of the present invention has minimum impedence to flow of stream 32 and that the necessary impedence for diverting a portion of the gaseous stream to aerate the flame may be separate from the impedence required for mixing, as shown by the many burner forms in FIGS. 9, 10, and 17–21, so that they need not be interrelated but can each perform their diverting or mixing function with minimum pressure drop without interfering with the operating function of the other.

Sixth and seventh, burner 30 has minimum initial cost and minimum operating cost. Burner 30 is of simple construction, occupies minimum space, and has minimum weight so as to be inexpensive to manufacture, and less expensive to support and to provide surrounding structure; has minimum length expensive refractory lining in exhaust duct 36 downstream from burner 30 since the downstream mixing and incineration chambers are of minimum length; has no moving parts; requires no separate combustion air, air blower, or air premixer since the oxygen supplied for combustion is usually furnished with the combustibles exhausted from hood 44 with this oxygen supplied at high temperature so that minimum temperature rise through burner 30 is required so as to reduce the fuel cost and cost of operation; has no expensive complex parts because burner 30 has a simple plate-like flame holder stabilizing or holding the flame by its simple design having all controlling flow directing edge portions 111a in FIG. 16 generally coplanar instead of having many different flow orifices and edges strung along the length of duct 36 or being dependent on high refractory temperatures; has no profile plates, air deflectors, mixing plates or baffles, joints between interconnected parts to provide joints hard to seal at high temperatures against unwanted air flow therethrough, too restrictive air flow openings, or extra walls to shield the flame against blowout (especially at low fire) so as needlessly to complicate the structure of burner 30, to raise the initial cost of burner 30, to raise flow pressure drop across burner 30 and/or to raise the fan power required for operation. Use of any of these special structures generally require a specially designed burner for each installation, instead of being able to achieve the economies of low initial manufacturing cost by using standard modular components, as in burner 30. Burner 30 consists essentially of substantially raw fuel being burned on a flat plate serving as a flame stabilizer to provide economy of initial cost further minimized in cost by permitting substantially identical, stamped, flat plates to be used for all size grids 90 and ducts 36. These aforementioned factors of design permit burner 30 to be economically designed for any type installation when careful economic consideration is taken of initial cost and operating costs relative to the size and cost of the processing equipment or oven under hood 44. Also, its small space and weight limitations permit it to be mounted in minimum clearance space with minimum support. Its compatability in catalytic-type incinerator 38a and recuperator-type incinerator 38c in FIGS. 23 and 24 permits substantial savings in operating cost, if desired. No maintenance or replacement problems are experienced for moving parts, expensive complex parts, refractories, etc. No downtime is necessary by mechanical failure or wear out of moving or complex parts.

Eighth, burner 30 has flexible operating characteristics capable of operating under all operating conditions. It operates satisfactory at all variations of combustible concentration in stream 32, even though this concentration may vary from time to time in any single exhaust duct 36; and operates with stable flame and flame holding conditions for all height flames, whether a low, medium or high flame or fire. Burner 30 operates over a large outlet temperature and temperature rise range. The amount of temperature rise can be easily changed by merely varying the size, location or orientation of the flow openings or edges so as to divert less air for a smaller temperature rise and more air for a larger temperature rise desired. This variation in size, etc. may be made either in the design and construction of the original burner or by easy adjustment made in the field of only shutter plates 94 and 96 by using only a screwdriver and wrench. Burner 30 is available in a wide variety of sizes and capacities to handle gaseous stream volumes from 460 cubic feet per minute to 28,000 cubic feet per minute, at 0.15 inch to 2 inch water column pressure drop across burner 30; and to raise the temperature of stream 32 from 3° to 1500° F., whatever is desired. These variations may be obtained by varying the size, location and orientation of the respective plate-like portions, surface portions, and stream flow edge portions over which stream 32 flows. Grid 90 is made in a wide variety of sizes to fit duct interior flow cross sections of 6" x 12" to 48" x 72".

Ninth, burner 30, when used as an incinerator 38 of any suitable type, can meet all present and anticipated federal, state, and municipal code requirements for incineration of fumes and other combustibles.

1. Reducing fuel costs of burner 30

Flame grid or burner 30 may be used in a non-catalytic incinerator 38b in FIG. 1 with no heat recovery from the exhaust gases being exhausted directly to the atmosphere, in catalytic-type incinerator 38a in FIG. 23, in recuperator-type incinerator 38c making use of the hot gaseous stream from burner 30 to preheat air for combustion or other purposes, or in any other method for extracting the heat from the hot gaseous stream downstream from burner 30. Reducing fuel cost by use of catalytic-type incinerator 38a, recuperator-type incinerator 38c, or above described method is very important in an incinerator since the fuel costs of an incinerator are high; and there is no direct return to the user of the incinerator, except good will, or lack of complaints on air pollution. Therefore it is generally advisable either to reduce the fuel costs as much as is practical or to recover as much usable heat as possible from the exhaust gases.

Catalytic-type incinerator 38a in FIG. 23 permits combustible incineration to take place at a lower temperature because of catalytic oxidation. The incineration temperature to which gaseous stream 32 must be heated by burner 30 is only about 800° F. in catalytic-type incinerator 38a (so as to result in a considerable saving of fuel) rather than about 1400° F. in non-catalytic type incinerator 38b. The oxidation reaction occurs at a lower ignition temperature because catalytic bed 196 accelerates the reaction without becoming a part of it after gaseous stream 32, containing combustibles, has traveled from source hood 44 through burner 30 to be heated to the incineration temperature. Although the velocity of stream 32 is greatly reduced as it passes through the maze of catalytic elements 196, mechanical mixing occurs therein to help the incineration process and to reduce the dwell time for incineration.

Recuperator-type incinerator 38c in FIG 24 has heat exchanger 198 for removing heat from the incinerator exhaust gases formed after gaseous stream 32 from hood 44 has been heated by incinerator burner 30. Heat exchanger 198 may be used to preheat gaseous stream 32 prior to incineration by burner 30 (as shown in FIG. 24), or to supply heat to a dryer, for example, unrelated to recuperator-type incinerator 38c. Whether or not heat exchanger 198 and recuperator-type incinerator 38c is used is generally determined on an individual basis by comparing the cost of maintenance, extra cost for support, and initial cost of heat exchanger 198; operating temperature of heat exchanger 198 and close proximity to where the heat is needed against the increased cost of fuel required.

Other methods may be used for extracting heat from the hot flue gases from burner 30 to reduce the total cost of operation. For example, the hot, clean exhaust gases from the incinerator can be recirculated back into the air inlet to the process or oven (exhausting to hood 44 combustible laden stream 32) in place of fresh air so as to reduce the direct fuel cost to the oven or industrial process feeding hood 44.

Combinations of these arrangements can be worked out to best fit any existing requirements. It has been found that as much as 60 to 65% saving in fuel cost is possible if heat recovery equipment is properly applied.

The invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A direct fired fluid fuel burner for directly heating a flowing gaseous stream capable of supporting combustion and flowing downstream in a duct past said burner, including fluid fuel supply pipe means adapted to extend at least partially across said stream in said duct, combustion zone surface means operatively associated with said pipe means, facing generally downstream of said stream flow, and forming an upstream portion of a combustion zone having a combustion flame therein, said fluid fuel pipe means having fluid fuel ports therein arranged to discharge fuel from said pipe means into a portion of said gaseous stream in said combustion zone downstream from said combustion zone surface means, diverting means responsive to flow of said stream for dividing said stream into main stream and diverted stream portions by diverting said diverted stream portions into various parts of said combustion zone generally in the quantities required for flame combustion in these respective combustion zone parts with velocity in each part being sufficiently low for fuel ignition, flame propagation and combustion to take place therein, flame holding means responsive to flow of said stream for generating low pressure on the downstream side of said combustion zone surface means for holding the flame in said combustion zone on said combustion zone surface means, and mixing means responsive to flow of said stream and combustion products for mixing after combustion said hot combustion products with all of said stream portions, surface portions bounded by stream flow edge portions over which portions of said stream flows, at least one of the means in the group of means (comprising diverting means, flame holding means, mixing means, and combustion zone surface means) including at least some of said surface and edge portions.

2. A burner, as set forth in claim 1, with
said some edge and surface portions not extending appreciably downstream from the upstream end of said combustion zone.

3. A burner, as set forth in claim 1, with
said some edge and surface portions being constructed and arranged to extend generally across at least part of the duct.

4. A burner, as set forth in claim 1, with
said some surface portions and edge portions being sufficiently planar and extending sufficiently across said duct in said flowing gaseous stream for forming a downstream wake with low pressure for flame holding and with low velocity for fuel ignition, flame propagation and combustion in the downstream combustion zone portions thereof at said some surface portions and with a surface of discontinuity downstream from said some edge portions causing gaseous stream eddies to be diverted toward said combustion zone for supplying to said combustion zone a portion of said gaseous stream for combustion with said surface of discontinuity formed by high velocity stream flow gradients over said edge portions causing said low pressure.

5. A burner, as set forth in claim 4, with
said some surface portions and edge portions creating turbulence beside and downstream of said combustion zone for mixing said products of combustion and gaseous stream together and forming said high velocity stream flow over said some edge portions for sucking some of the combustion products from said combustion zone at said some edge portions into the gaseous stream flowing therepast.

6. A burner, as set forth in claim 5, with
said some surface portions and edge portions being planar and constructed and arranged to extend transversely across at least part of said duct.

7. A burner, as set forth in claim 4, with
said some surface portions and edge portions being planar and constructed and arranged to extend transversely across at least part of said duct.

8. A burner, as set forth in claim 6, with
at least some of said edge portions being edges of holes in said surface portions.

9. A burner, as set forth in claim 1, with
said some edge portions forming the entire distal edge of said some surface portions over which some of said stream portions are diverted.

10. A burner, as set forth in claim 1, with
said diverting, flame holding, combustion zone surface and mixing means including said some edge and surface portions.

11. An incinerator for mounting in a duct, comprising a burner, as set forth in claim 10,
all of the aforesaid means comprising means for heating said gaseous stream, including oxygen and combustibles, as quickly as possible to incineration temperature, with minimum pressure drop across the burner, and with a substantially uniform outlet temperature and thorough mixing of all portions of the gaseous stream and combustion products at minimum distance downstream from said burner for incinerating said combustibles in minimum time and at minimum expense.

12. A burner, as set forth in claim 1, with
said some surface and edge portions constructed and arranged to extend across at least part of said duct.

13. A burner, as set forth in claim 12, with
plate-like portions arranged to extend across said duct and having said some surface portions as the downstream surface thereof.

14. A burner, as set forth in claim 13, with
at least some of said plate-like portions comprising component portions of a solid plate having said burner ports in the center thereof and all of the edge portions of said plate located on the periphery of said plate.

15. A burner, as set forth in claim 13, with
at least some of said plate-like portions comprising a screen having holes therein bounding said some surface portions located on the downstream surface of the component wires thereof and having some of said some edge portions around the holes therein.

16. A burner, as set forth in claim 13, with
at least some of said plate-like portions being the downstream wall of at least some of said fuel pipe means.

17. A burner, as set forth in claim 13, with
at least some of said plate-like portions having a flow opening portion of at least one flow opening for forming a flow path for said gaseous stream in said duct,
some of said edge portions forming said opening portion.

18. A burner, as set forth in claim 17, with
said opening being a hole in said plate-like portion.

19. A burner, as set forth in claim 17, with
said plate-like portions being coplanar separate plate-like portions.

20. A burner, as set forth in claim 19, with
said opening being at least partially formed by opening portions on edges of and between adjacent plate-like portions.

21. A burner, as set forth in claim 17, with
said opening portion being formed by the distal edge of a plate-like portion arranged to coact with the wall of the duct to form said gaseous stream flow path therebetween.

22. A burner, as set forth in claim 17, with
said plate-like portions including parallel layers of plate-like portions having an opening portion in each plate-like portion coacting to form a portion of said flow path for said gaseous stream flow and to be relatively shifted to change the shape of the stream flow path defined thereby.

23. A burner, as set forth in claim 22, with
at least some of the plate-like portions in one of said layers being laterally spaced apart for shifting laterally only one of said last mentioned some plate-like portions for changing the shape of only selected some of said openings.

24. A burner, as set forth in claim 17, with
a plurality of said openings,
the percent of open area of said openings gradually increasing as the distance from said burner ports across said duct increases for providing less gaseous stream diversion by said diverting means for supporting combustion of a lower flame in said combustion zone over said ports, for causing more rapid mixing by said mixing means downstream from said larger percent of open area, and for permitting a larger portion of said gaseous stream to flow through said larger percent of open area.

25. A burner, as set forth in claim 1, with
shutter means including at least some of said some edge portions for changing the shape of at least some of the gaseous stream flow paths for changing at least some quantity of the function performed by at least one of the means in said group of means.

26. A burner, as set forth in claim 25, with
said shutter means including means for changing the gaseous stream pressure drop across said burner.

27. A burner, as set forth in claim 25, with
said shutter means including means for making more uniform the gaseous stream flow across said burner.

28. A burner, as set forth in claim 25, with
said shutter means including means for changing the products of combustion and gaseous stream mixing rate by said burner.

29. A burner, as set forth in claim 25, with
said shutter means including means for changing the gaseous stream flow rate through only one portion of said burner.

30. A burner, as set forth in claim 25, with
said shutter means including relatively movable shutter leaves,
one of said shutter leaves providing the flame holding surface of said flame holding means.

31. A burner, as set forth in claim 1, with
said diverting means, combustion zone surface means, and flame holding means including said some edge and surface portions.

32. A burner, as set forth in claim 31, with
said component some surface and edge portions being located upstream from their associated combustion zone portions with the flame in said combustion zone adapted to burn freely in said duct downstream from said portions with said some surface portions acting as said flame holding means.

33. A burner, as set forth in claim 32, with
said combustion zone surface means and flame holder means constructed and arranged to protect said flame from quenching by said gaseous stream.

34. A burner, as set forth in claim 1, with
said diverting means including said some edge and surface portions.

35. A burner, as set forth in claim 34, with
some of said some surface portions constructed and arranged to shield the combustion zone from any blast of said flowing gaseous stream adequate to quench the flame in said combustion zone,
said diverting means being constructed and arranged automatically to supply the quantities required of diverted gaseous stream portions capable of supporting combustion to various parts of said combustion zone for any selected low, intermediate or high flame with the flame extending into more combustion zone parts as it increases in sizes.

36. A burner, as set forth in claim 34, with
said flame holding means including the same said some edge and surface portions.

37. A burner, as set forth in claim 1, with
said flame holding means including said some edge and surface portions.

38. A burner, as set forth in claim 37, with
said fuel ports constructed to discharge said fuel closely contiguous to said some surface portions and spaced from said some edge portions,
said low pressure being generated on the downstream side of said some surface portions for making said flame cling to said some surface portions as said combustion zone surface means.

39. A burner, as set forth in claim 37, with
said fuel ports constructed to discharge said fuel closely contiguous to said some surface portions and spaced from said some edge portions,
said low pressure being generated on the downstream side of said some surface portions for keeping said flame in said combustion zone during all gaseous stream flow velocities and fuel flow rates.

40. A burner, as set forth in claim 37, with
said flame holding means consisting of a flat plate-like portion arranged to extend across said duct and having said some surface portions as the downstream surface thereof.

41. A burner, as set forth in claim 40, with
said burner being constructed so that said fuel is substantially raw fuel.

42. A burner, as set forth in claim 37, with
said some surface and edge portions being constructed and arranged so that said gaseous stream flows at high speed over said some edge portions to pull the flame in said combustion zone over all of said some surface portions to said some edge portions to spread the edge of the flame portions to all of said some edge portions,
said some edge portions being constructed and arranged to form many flow paths across the duct for said gaseous stream flowing past the edges of the flame portions.

43. A burner, as set forth in claim 42, with
said flame holding means being a wall means constructed and arranged to extend across substantially the full flow area of said duct.

44. A burner, as set forth in claim 37, with
said some surface and edge portions being constructed and arranged so that said gaseous stream flows at higher speed over said some edge portions to pull the flame in said combustion zone over all of said some surface portions.

45. An incinerator for mounting in a duct, comprising
a burner, as set forth in claim 44,
said some surface portions being closely spaced and constructed and arranged to spread across substantially the full flow area of said duct for providing a blanket of flame across said duct through which said gaseous stream passes for incinerating combustibles in said stream.

46. A burner, as set forth in claim 44, with
said some surface portions forming a grid extending across substantially the full flow area of said duct.

47. A burner, as set forth in claim 1, with
said mixing means including said some edge and surface portions.

48. A burner, as set forth in claim 47, with
said mixing means having its rate of mixing determined by the shape and location of said some surface and edge portions relative to said burner ports and duct.

49. A burner, as set forth in claim 47, with
said mixing means being constructed and arranged for producing uniform temperature over the width of the duct in minimum distance downstream from said burner.

50. A dryer, comprising
a burner, as set forth in claim 49, for uniformly drying liquid or granular products spead across the duct located downstream from said burner.

51. An incinerator for mounting in a duct, comprising
a burner, as set forth in claim 49, having minimum length mixing chamber and maintaining minimum differential temperature between hot and cold spots in said gaseous stream for incinerating said combustibles.

52. A burner, as set forth in claim 47, with
said some edge portions forming the entire distal edge of said flame holder means over which said diverted stream portions pass.

53. A burner, as set forth in claim 47, with
said some surface and edge portions being constructed and arranged so that said gaseous stream flows at high speed over said some edge portions to pull the flame in said combustion zone over all of said some surface portions to said some edge portions to spread the edge of the flame portions to all of said some edge portions,
said some edge portions constructed and arranged to form many flow paths across the duct for said gaseous stream flowing past the edges of the flame portions for forming the maximum flame face length exposed to the flowing gaseous stream for providing maximum mixing of the combustion products from the flame with said gaseous stream.

54. A burner, as set forth in claim 47, with
said some surface and edge portions being constructed and arranged so that said gaseous stream flows at high speed over said some edge portions for sucking the combustion products from said combustion zone over said some surface portions to said some edge portins and into said flowing gaseous stream for providing mixing of the combustion products and said gaseous stream.

55. A burner, as set forth in claim 47, with
said some edge portions constructed and arranged for forming a surface of discontinuity in the gaseous stream flowing thereover with turbulence directed downstream therefrom beside said combustion zone and downstream therefrom for mixing said goseous stream with the combustion products discharged from said combustion zone.

56. A burner, as set forth in claim 47, with
said some surface portions separated by said some edge portions being close together and spaced across said duct for providing many flames in combustion zone portions similarly spaced for causing the combustion products from said combustion zone portions to disperse laterally for rapidly mixing into said flowing gaseous stream.

57. A burner, as set forth in claim 47, with
some of said some edge portions being portions of openings for forming a flow path for said gaseous stream, the percent open area formed by some of said openings being substantially greater in one flow path than in a contiguous flow path of said gaseous stream for causing turbulent mixing downstream of said openings by the different relative velocity of said flow paths.

58. A direct fired fluid fuel burner for directly heating a flowing gaseous stream capable of supporting combustion and flowing downstream in a duct past said burner, including fluid fuel supply pipe means adapted to extend at least partially across said stream in said duct, combustion zone surface means operatively associated with said pipe means, facing generally downstream of said stream flow, and forming an upstream portion of a combustion zone having a combustion flame therein, said fluid fuel pipe means having fluid fuel ports therein arranged to discharge fuel from said pipe means into a portion of said gaseous stream in said combustion zone downstream from said combustion zone surface means, said combustion zone surface means having a plurality of approximately uniformly spaced apart portions of said combustion zone surface means with each having a combustion zone portion with a flame portion with a portion of said gaseous stream flowing between said combustion zone surface portions for extending across approximately the entire duct for giving maximum length flame face and combustion products from each combustion zone portion exposed to the flowing gaseous stream for providing maximum mixing in minimum distance along the flow of said gaseous stream, said fuel pipe means including a plurality of fuel pipes constructed and arranged to extend parallel to each other, across the duct, and having said fuel ports spaced lengthwise along approximately the full length of each pipe.

59. A direct fired fluid fuel burner for directly heating a flowing gaseous stream capable of supporting combustion and flowing downstream in a duct past said burner, including fluid fuel supply pipe means adapted to extend at least partially across said stream in said duct, combustion zone surface means operatively associated with said pipe means, facing generally downstream of said stream flow, and forming an upstream portion of a combustion zone having a combustion flame therein, said fuel fuel pipe means having fluid fuel ports therein arranged to discharge fuel from said pipe means into a portion of said gaseous stream in said combustion zone downstream from said combustion zone surface means, said fuel supply pipe means including a plurality of generally parallel fuel supply pipes extending across said stream in said duct, flat plate-like portions carried by said fuel pipes and having said combustion surface means thereon between portions of an opening in said plate-like portions for forming a flow path for said gaseous stream through said duct intimately contiguous to the flame in the combustion zone, said combustion zone surface means forming a flame holding surface.

60. A burner, as set forth in claim 59, with said fuel supply means including a manifold having said parallel fuel supply pipes detachably connected thereto, said flat plate-like portions being detachably connected to said parallel fuel supply pipes and comprising a plurality of identical plates arranged coplanar on said pipes to form a grid across said duct, said detachable pipes, and plates being of sizes permitting modular build up of the burner for any size rectangular duct.

61. A burner, as set forth in claim 59, with said plate-like portions being located on the downstream side of said fuel supply pipes and having apertures therein coinciding with the fuel ports to permit fuel from said fuel supply pipes to flow into said combustion zone.

62. A burner, as set forth in claim 59, with said plate-like portions including parallel layers of plate-like portions carried by said fuel supply pipes and having in different layers opening portions coacting to form a flow opening therethrough in the direction of gaseous stream flow, and connecting means for connecting said plate-like portions for permitting relative sliding movement between said plate-like portions in said different layers across the duct for changing the effective flow area of any flow opening formed thereby.

63. A burner, as set forth in claim 62, with the plate-like portions in one of said layers including a plurality of spaced apart coplanar plate-like portions for changing the effective flow area of only some of said openings by planar relative movement of only some of said plate-like portions in said one layer.

64. A burner, as set forth in claim 63, with said plate-like portions forming a grid and said flame holding surface for extending across approximately the entire duct for giving maximum length flame face and combustion products for each combustion zone exposed to the flowing gaseous stream for providing maximum mixing in the minimum distance along the flow of said gaseous stream, said plate-like portions being located on the downstream side of said fuel supply pipes and having apertures therein coinciding with the fuel port to permit fuel from said fuel supply pipes to flow into said combustion zone, said fuel supply means including a manifold having said parallel fuel supply pipes detachably connected thereto, said flat plate-like portions being detachably connected to said parallel fuel supply pipes and comprising a plurality of identical plates arranged coplanar on said pipes to form a grid across said duct, said detachable pipes, and plates being of sizes permitting modular build up of the burner for any size rectangular duct.

65. A burner, as set forth in claim 59, with said plate-like portions forming a grid adapted to extend across said duct.

66. A burner, as set forth in claim 65, with said flame holding surface adapted to extend across the entire grid for providing a flame blanket across said duct.

67. A direct fired fluid fuel burner for directly heating a flowing gaseous stream capable of supporting combustion and flowing downstream in a duct past said burner, including fluid fuel supply pipe means adapted to extend at least partially across said stream in said duct, combustion zone surface means operatively associated with said pipe means, facing generally downstream of said stream flow, and forming an upstream portion of a combustion zone having a combustion flame therein, said fluid fuel pipe means having fluid fuel ports therein arranged to discharge fuel from said pipe means into a portion of said gaseous stream in said combustion zone downstream from said combustion zone surface means, a generally flat plate-like portion having said combustion zone surface means thereon and constructed and arranged to separate the combustion zone from the downstream flow of said gaseous stream.

(References on following page)

References Cited

UNITED STATES PATENTS

| | | |
|---|---|---|
| 2,837,893 | 6/1958 | Schirmer. |
| 3,051,464 | 8/1962 | Yeo et al. |
| 3,186,697 | 6/1965 | Haedike et al. |

FOREIGN PATENTS 361,648  11/1931  Great Britain.

JOHN J. CAMBY, Primary Examiner

U.S. Cl. X.R.

43—351

UNITED STATES PATENT OFFICE
CERTIFICATE OF CORRECTION

Patent No. 3,524,632    Dated August 18, 1970

Inventor(s) Theodore E. Davies

It is certified that error appears in the above-identified patent and that said Letters Patent are hereby corrected as shown below:

Column 1, line 55, "positions" should be --portions--.
Column 3, line 43, "in a" should be --ing a--.
Column 5, line 45, "qunetly" should be --quently--; line 66, "stoichimetric" should be --stoichiometric--.
Column 6, line 54, "(a)" should be --a.--.
Column 8, line 7, "(b)" should be --b.--.
Column 10, line 1, "(c)" should be --c.--.
Column 11, line 21, "apart in" should be --apart--; line 60, "(d)" should be --d.--.
Column 13, line 28, "temperautre" should be --temperature--; line 46, "(e)" should be --e.--.
Column 15, line 11, "(f)" should be --f.--; line 14, "sample" should be --simple--; line 22, "along" should be --long in--; line 39, "continuous" should be --contiguous--; line 52, "surface" should be --surfaces--; line 69, "kinetic" should be --kinetic,--.
Column 16, line 9, "in combustion" should be --in a combustion--; line 57, "(g)" should be --g.--; line 64, "plates in" should be --plates 96 in--.
Column 17, line 3, "of over" should be --or over--; line 36, "range in" should be --range is--.
Column 18, line 21, "well" should be --wall--.
Column 19, line 17, "surfaces" should be --surface--; line 34, "to uniform" should be --of uniform--.
Column 20, line 60, "(h)" should be --h.--.
Column 22, line 16, "(FIG.11)" should be --FIG. 11)--.
Column 23, line 14, "level" should be --fuel--.
Column 24, line 62, "5 5/16" should be --5 15/16--; line 70, "(i)" should be --i.--.
Column 25, line 18, "163' in" should be --163 in--; line 32, "slots" should be --slots on--; line 37, "betwen" should be --between--; line 46, "portion, "as" should be --portion or--; line 60, "pipe and/or" should be --pipe 156 and/or--; line 65, "96e, 94e', or" should be --96e, 96f, 96g, 94e' or--.

UNITED STATES PATENT OFFICE
CERTIFICATE OF CORRECTION

Patent No. 3,524,632          Dated August 18, 1970

Inventor(s) Theodore E. Davies

It is certified that error appears in the above-identified patent and that said Letters Patent are hereby corrected as shown below:

Column 26, line 41, "(j)" should be --j.--; line 61, "96' and" should be --96v' and--.
Column 28, line 46, "(k)" should be --k.--.
Column 30, line 33, "30 and/or" should be --30, and/or--.
Column 33, line 71, "said edge" should be --said some edge--.
Column 35, line 17, "incerases" should be --increases--.
Column 36, line 61, "goseous" should be --gaseous--.
Column 37, line 49, "said fuel fuel" should be --said fluid fuel--.

Signed and sealed this 20th day of April 1971.

(SEAL)
Attest:

EDWARD M. FLETCHER, JR.          WILLIAM E. SCHUYLER, JR.
Attesting Officer                Commissioner of Patents